US011442806B2

(12) United States Patent
Takano et al.

(10) Patent No.: US 11,442,806 B2
(45) Date of Patent: Sep. 13, 2022

(54) VEHICLE DISPLAY APPARATUS

(71) Applicant: NIPPON SEIKI CO., LTD., Niigata (JP)

(72) Inventors: Tetsuhiro Takano, Niigata (JP); Yuya Iwata, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 578 days.

(21) Appl. No.: 16/484,003

(22) PCT Filed: Feb. 6, 2018

(86) PCT No.: PCT/JP2018/004044
§ 371 (c)(1),
(2) Date: Aug. 6, 2019

(87) PCT Pub. No.: WO2018/150956
PCT Pub. Date: Aug. 23, 2018

(65) Prior Publication Data
US 2020/0019457 A1  Jan. 16, 2020

(30) Foreign Application Priority Data

Feb. 17, 2017  (JP) .............................. JP2017-027421
Aug. 18, 2017  (JP) .............................. JP2017-158094

(51) Int. Cl.
*G06F 11/10* (2006.01)
*B60K 35/00* (2006.01)
*G02B 27/01* (2006.01)

(52) U.S. Cl.
CPC .......... *G06F 11/1004* (2013.01); *B60K 35/00* (2013.01); *G02B 27/0101* (2013.01);
(Continued)

(58) Field of Classification Search
CPC ................ G06F 11/1004; B60K 35/00; B60K 2370/186; B60K 2370/347;
(Continued)

(56) References Cited

U.S. PATENT DOCUMENTS 11,132,850 B1*  9/2021  Tanada ................... G07C 5/008
11,221,929 B1*  1/2022  Katz .................... G06F 11/1004
(Continued)

FOREIGN PATENT DOCUMENTS

JP    2011-195007 A    10/2011
JP    2012-035677 A    2/2012
JP    2016-074290 A    5/2016

OTHER PUBLICATIONS

International Search Report issued in corresponding International Patent Application No. PCT/JP2018/004044, dated Apr. 24, 2018, with English Translation.

*Primary Examiner* — Ibrahim A Khan
(74) *Attorney, Agent, or Firm* — McDermott Will & Emery LLP

(57) ABSTRACT

A vehicle display apparatus has a display and a control unit. The control unit detects whether or not an error recognizable by users of the vehicle has occurred in an image on the display on the basis of the result of matching between a first error detection code, which is generated on the basis of image data transmitted to a display drive unit, and a second error detection code, which is generated on the basis of the image data received by the display drive unit, to determine whether notification is required or not, and provides notification on deterioration in the reliability of the image on the display by controlling light-emitting elements and sound output units provided on the vehicle display apparatus or by way of a superordinate device.

12 Claims, 13 Drawing Sheets

(52) U.S. Cl.
CPC .. *B60K 2370/186* (2019.05); *B60K 2370/347* (2019.05); *G02B 2027/0141* (2013.01)

(58) Field of Classification Search
CPC ...... B60K 2370/1575; B60K 2370/178; B60K 37/02; G02B 27/0101; G02B 2027/0141; G01D 7/00
See application file for complete search history.

(56) References Cited

U.S. PATENT DOCUMENTS

| | | | |
|---|---|---|---|
| 2012/0036418 A1* | 2/2012 | Morino | B60K 35/00 |
| | | | 714/E11.032 |
| 2016/0307346 A1 | 10/2016 | Staudenmaier et al. | |
| 2017/0353698 A1* | 12/2017 | Bai | B60R 1/00 |
| 2018/0145662 A1* | 5/2018 | Kawahito | H03K 19/017509 |
| 2018/0165814 A1* | 6/2018 | Gulati | G06T 7/001 |
| 2019/0073260 A1* | 3/2019 | Morizumi | H03M 13/09 |
| 2019/0181982 A1* | 6/2019 | Hardacker | H04L 12/40045 |
| 2021/0181990 A1* | 6/2021 | Balb | G06F 3/0659 |

* cited by examiner

FIG. 2(A)
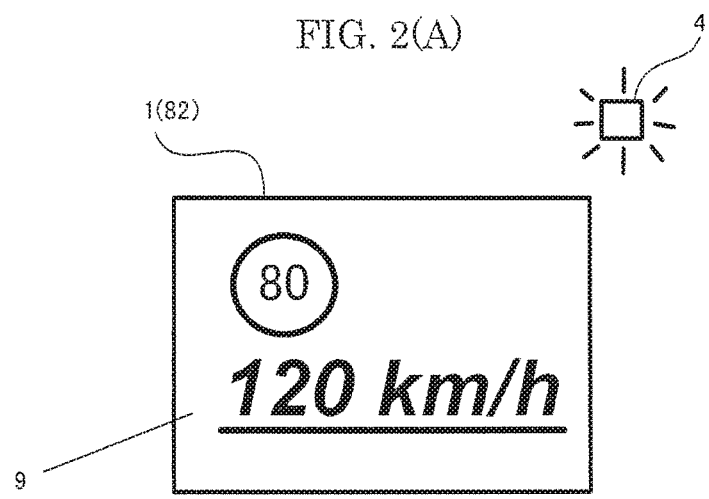
FIG. 2(B)
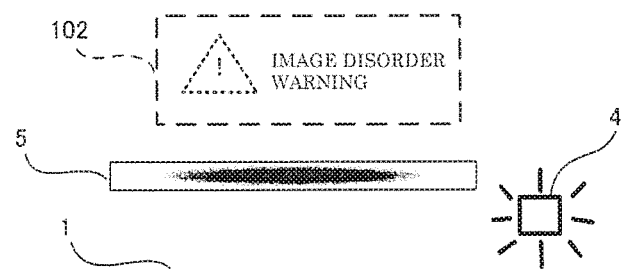
FIG. 2(C)
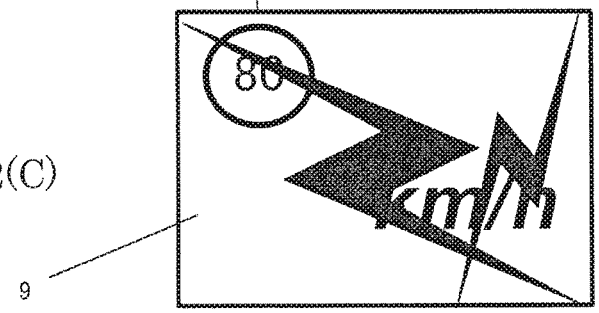
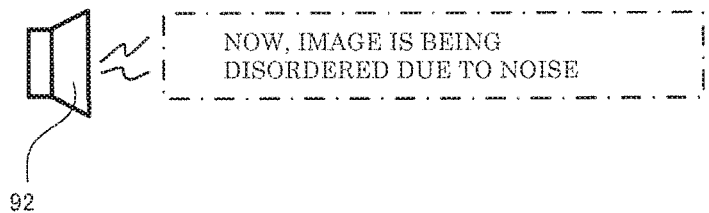

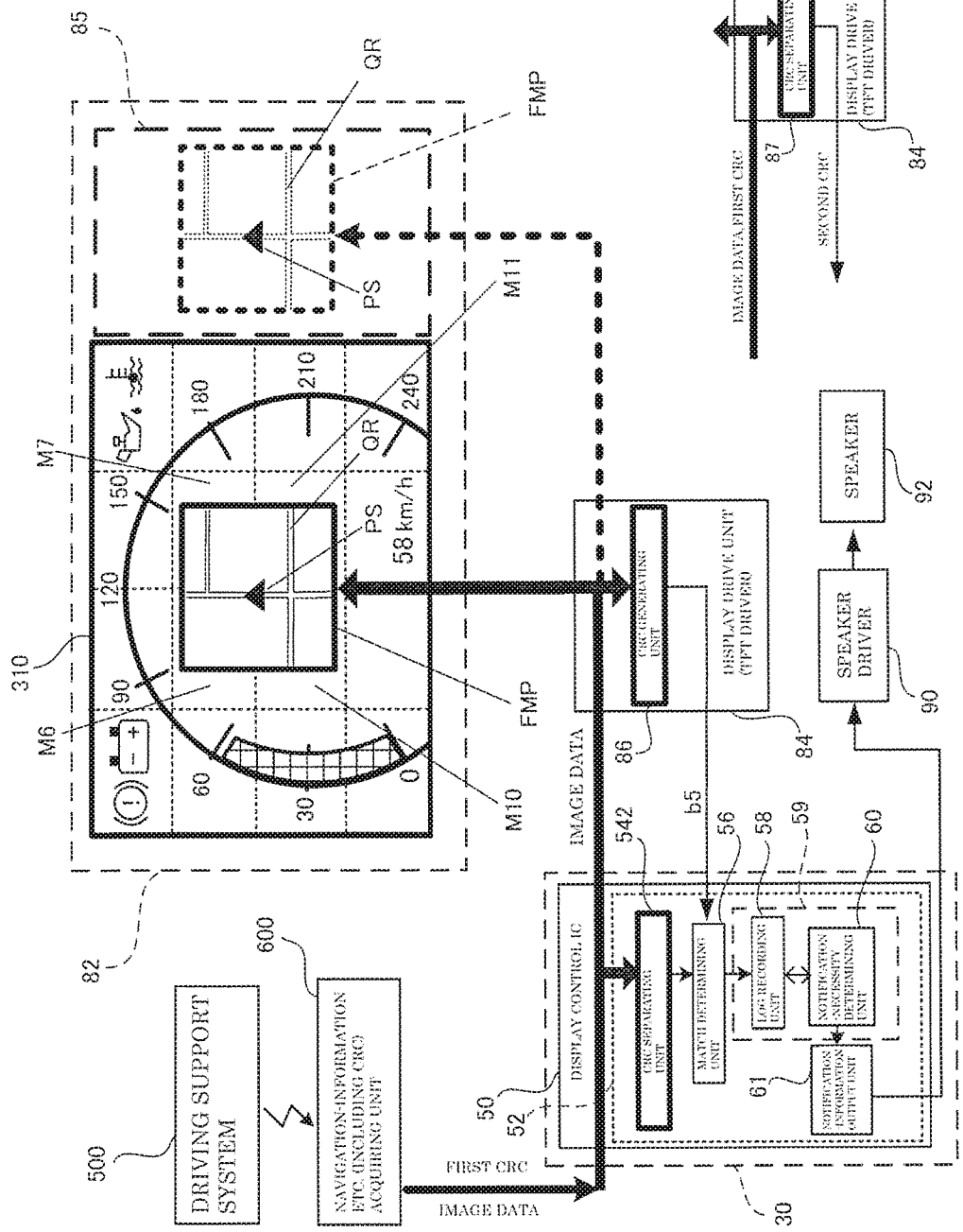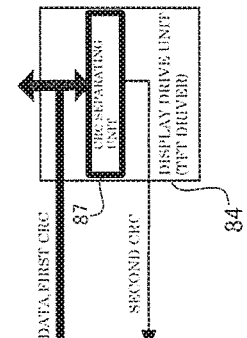

VEHICLE DISPLAY APPARATUS

CROSS REFERENCE

This application is the U.S. National Phase under 35 U.S.C. § 371 of International Patent Application No. PCT/JP2018/004044, filed on Feb. 6, 2018, which claims the benefit of Japanese Patent Application No. 2017-027421, filed on Feb. 17, 2017 and Japanese Patent Application No. 2017-158094, filed on Aug. 18, 2017, the entire contents of each are hereby incorporated by reference.

TECHNICAL FIELD

The present invention relates to a vehicle display apparatus mounted on a vehicle such as car or motorcycle.

BACKGROUND ART

Vehicle display apparatuses include, for example, the one disclosed in Patent Literature 1. This vehicle display apparatus includes: a display panel that displays various types of vehicle information; and a control means that receives various types of information including the operating state of the main switch of the vehicle, based on the information, generates display information for displaying various types of vehicle information, and controls driving of the display panel, and the control means performs a display determination process to determine whether the display control has been performed to display the desired display information when the display information is displayed on the display panel and, when it is determined that the display control has not been performed during the display determination process, performs a notification process to prompt notification that there is a failure during the display control after the main switch has shifted from the on state to the off state.

PRIOR ART DOCUMENT

Patent Document

Patent Literature 1: Japanese Unexamined Patent Application Publication No. 2011-195007

SUMMARY OF THE INVENTION

Problems to be Solved by the Invention

The vehicle display apparatus described in Patent Literature 1, however, includes no means to notify an error in image data, transmitted from the control unit (e.g., graphics display system) to the display, from the display side to the control unit (graphics display system) side when, for example, some factor such as external noise causes a defect in part of the image data, and it is difficult for the user (the driver, or the like) of the vehicle to check the certainty of the vehicle information displayed on the display unit.

For example, when a warning about a predetermined event (e.g., an event that the speed has exceeded the upper limit, an event that the number of revolutions of the engine has reached the red zone, or an event during navigation for which the user's attention is to be promoted, e.g., the vehicle ahead has suddenly applied a brake, or there is a sharp right turn ahead) is given to the user by, for example, flashing an indicator (warning indicator) functioning as a warning light and, at the same time, a warning for the same event is given by the display using an image, if an event occurs such that, while the warning indicator is continuously flashed, or the like, the image on the display is significantly disordered due to noise, etc., the user (the driver, etc.) is unable to distinguish between the situation where the event is too serious to enable the display and the situation where the display is disordered due to a disturbance such as noise (i.e., the reliability of the image has degraded). The conventional technology does not consider measures against the above-described problems and is unable to take measures to reduce the user's feeling of anxiety.

It is an object of the present invention to provide proper notification in a vehicle display apparatus so that the user of the vehicle is not confused even when an error occurs in an image on the display. Other objects of the present invention should be apparent to those skilled in the art by referring to the aspect and the preferred embodiment described below as examples and attached drawings.

Solution to Problem

Aspects in accordance with the present invention are described below as examples for easy understanding of the summary of the present invention.

In a first aspect, a vehicle display apparatus comprising: a display that is mounted on a vehicle and displays vehicle information; any one or both of a light-emitting element unit including at least one light-emitting element and a sound output unit; a display drive unit that drives the display; and a control unit that controls the display drive unit so as to display an image on the display and that controls an operation of at least one of the light-emitting element unit and the sound output unit, wherein the control unit includes a first error-detection code generating unit that generates a first error detection code based on image data transmitted from the control unit to the display drive unit, the display drive unit includes a second error-detection code generating unit that generates a second error detection code based on image data received by the display drive unit, the control unit or the display drive unit includes a match determining unit that determines a match between the first error detection code and the second error detection code, and the control unit further includes: a notification-necessity determining unit that determines whether notification is necessary by detecting whether an error recognizable by a user of the vehicle has occurred in an image on the display based on a situation where a mismatch is detected by the match determining unit; and a notification-information output unit that, when the notification-necessity determining unit determines that notification is necessary, generates notification information for notifying that reliability of the image on the display has degraded and outputs the generated notification information to control an operation of at least any one of the light-emitting element unit and the sound output unit or outputs the generated notification information to a higher-level device of the vehicle display apparatus so as to provide notification via the higher-level device.

With the vehicle display apparatus of the first aspect, it is detected whether, based on the situation where a mismatch is detected by the match determining unit, an error recognizable by the user of the vehicle has occurred in an image on the display and, when an error has occurred, the notification-information output unit outputs the notification information to control the operation of at least one of the light-emitting element unit and the sound output unit or outputs it to the higher-level device of the vehicle display apparatus so as to provide notification via the higher-level device. Therefore, it is possible to clearly notify the user that there is a situation where the display is being disordered due to a disturbance such as noise (i.e., the reliability of the image has degraded) by, for example, sending a message such as "now, the image is being disordered due to noise" with sound (or giving notification with a buzzer sound, or the like, or giving notification by using the light emission state of the light-emitting element or the display of warning texts, graphics, or the like) by using the sound output unit (or an information system, or the like, included in the higher-level device) included in the vehicle display apparatus. Therefore, the user (the driver, or the like) is not confused while driving the vehicle, and the user has less feeling of anxiety. That is, the vehicle display apparatus of this aspect is capable of providing useful information contributing to safe driving, which is conventionally difficult, and it achieves unprecedented high-level safe driving environments.

In a second aspect according to the first aspect, the notification-necessity determining unit may determine that notification is necessary when a mismatch has occurred during a predetermined period of time in the match determining unit.

In the second aspect, it is possible to accurately detect whether an error recognizable by the user of the vehicle has occurred in the image on the display by determining whether notification is to be provided in consideration of a mismatch situation over time, and therefore the possibility of the unnecessary notification may be reduced.

In a third aspect according to the first or the second aspect, the control unit and the display drive unit may be connected via a first cable and a second cable different from the first cable, when the control unit transmits image data to the display drive unit, transmission may be conducted via the first cable, and when the display drive unit transmits the second error detection code or information indicating a result of a match determination by the match determining unit to the control unit, transmission may be conducted via the second cable, and when the control unit transmits the first error detection code to the display drive unit, transmission may be conducted via the second cable.

In the third aspect, as a cable for transmitting image data is separated from a cable for communicating information (signals) necessary to determine whether the reliability of the image data has degraded, it is possible to reduce the extent to which information (signals) necessary for a determination is adversely affected by noise, or the like, and it is thus possible to ensure the reliability of the determination.

In a fourth aspect according to any one of the first to the third aspects, when the light-emitting element unit is provided, the light-emitting element unit may include a light-emitting element as a warning light, and the control unit may give a warning about an event related to the vehicle by using an image display on the display when a warning is given for the event by using a light emission state of the light-emitting element as the warning light, and when an image for warning is displayed on the display, cause the match determining unit to determine a match between the first error detection code and the second error detection code and cause the notification-information output unit to generate and output notification information.

In the fourth aspect, when a warning about a certain event is given by a light-emitting element (warning indicator) functioning as a warning light and, at the same time, a warning for the same event is also given by the display using an image, if an event occurs such that, while the warning indicator is continuously flashed, or the like, the image on the display is significantly disordered due to noise, etc., the user (the driver, etc.) is able to clearly know that it is not a situation where the event is too serious to enable the display but a situation where the display is being disordered due to a disturbance such as noise (i.e., the reliability of the image has degraded). Therefore, the user (the driver, or the like) is not confused while driving the vehicle, and the user has less feeling of anxiety.

In a fifth aspect according to any one of the first to the fourth aspects, when the light-emitting element unit is provided, the light-emitting element unit may include a light-emitting element that illuminates surroundings, and to provide notification that reliability of a display image on the display has degraded, the light-emitting element illuminating the surroundings may enter a different light emitting state as compared with the case of illuminating the surroundings, and when the sound output unit is provided, the sound output unit may provide notification that the reliability of the image on the display has degraded with sound or voice.

In the fifth aspect, by providing notification using an illumination light source included in the vehicle display apparatus or using a means included in the vehicle display apparatus or the vehicle and capable of outputting sound, it is possible to effectively use the existing equipment and reduce the equipment to be newly added.

In a sixth aspect according to any one of the first to the fifth aspects, a CRC (Cyclic Redundancy Check: cyclic redundancy check) code may be used as the error detection code.

In the sixth aspect, error detection may be reliably performed by using CRC codes that have been used in the field of error detection.

In a seventh aspect according to the first aspect, one screen displayed on the display may be divided into a plurality of areas, the first error-detection code generating unit and the second error-detection code generating unit may generate the first and the second error detection codes, respectively, as an error detection code for an area specified on a section-by-section basis after the dividing, and the match determining unit may determine a match between the first and the second error detection codes with respect to the area specified on a section-by-section basis after the dividing.

In the seventh aspect, one screen is divided into a plurality of areas, and an error detection code such as the first or the second CRC code is generated for the area specified on a section-by-section basis after division. For example, when one screen is divided into sixteen, an error detection code may be generated for each "1/16 area (it is one section after division)". In this case, the "1/16 area" is the specified area. Furthermore, for example, "the group of four areas, i.e., 4/16 areas" may be specified as one area (for example, one area is specified by using the coordinates on the display surface of the display), and one error detection code may be generated for the "4/16 area". Further, the first and the second error detection codes for one specified area are compared (compare check) with each other so as to detect that the reliability has degraded in the specific area on the display screen. For example, as the reliability may be checked by focusing on the display area having a particularly high degree of importance on one screen, it is possible to provide notification of more accurate and useful information. In other words, useful information contributing to safe driving, which is conventionally difficult, may be provided, and unprecedented high-level safe driving environments are achieved.

In an eighth aspect according to the seventh aspect, the first and the second error-detection code generating units may adjust numbers of times the first and the second error detection codes are generated, respectively, per unit time in accordance with a priority order determined based on importance of a display in an area specified on a section-by-section basis after the dividing.

In the eighth aspect, the priority order is determined in accordance with the degree of importance of the content displayed on the above-described specified area. For example, the large number of times an error detection code is generated per unit time is set (i.e., a higher error detection code generation rate is set) for the area with a high priority order as compared with the area with a low priority order, whereby it is possible to set a high detection accuracy for display errors (drawing errors) for the display of content with a high degree of importance. A low error detection code generation rate is set for the area with a relatively low degree of importance so that it is possible to reduce the load (i.e., the processing load for an error detection code) on the device (a control circuit board, etc.) involved in the error detection code generation process, the comparison process (compare check process), etc. Further, the determination of the priority order may be performed corresponding to, for example, a plurality of classes (e.g., classes such as highest priority, priority, minimum processing, or processing unnecessary) according to a predetermined criterion.

In a ninth aspect according to the eighth aspect, the first and the second error-detection code generating units may refrain from generating the first and the second error detection codes, respectively, when the priority order is low for the area specified on a section-by-section basis after the dividing.

In the ninth aspect, as the generation of error detection codes is not needed for areas with a low priority order, the processing load on the device (the control circuit board, etc.) for error detection codes is reduced.

In a tenth aspect, a vehicle display apparatus comprising: a display that is mounted on a vehicle and displays vehicle information; any one or both of a light-emitting element unit including at least one light-emitting element and a sound output unit; a display drive unit that drives the display; and a control unit that controls the display drive unit so as to display an image on the display and that controls an operation of at least one of the light-emitting element unit and the sound output unit, wherein the control unit receives image data and a first error detection code generated based on the image data, and the control unit transmits only the image data or both the image data and the first error detection code to the display drive unit, the display drive unit includes an error-detection code generating unit that generates a second error detection code based on the image data received by the display drive unit or includes an error-detection code separating unit that separates only the first error detection code from the image data and the first error detection code, received by the display drive unit, and outputs as the second error detection code, the control unit or the display drive unit includes a match determining unit that determines a match between the first error detection code input to the control unit and the second error detection code generated or output by the display drive unit, and the control unit further includes: a notification-necessity determining unit that determines whether notification is necessary by detecting whether an error recognizable by a user of the vehicle has occurred in an image on the display based on a situation where a mismatch is detected by the match determining unit; and a notification-information output unit that, when the notification-necessity determining unit determines that notification is necessary, generates notification information for notifying that reliability of the image on the display has degraded and outputs the generated notification information to control an operation of at least any one of the light-emitting element unit and the sound output unit or outputs the generated notification information to a higher-level device of the vehicle display apparatus so as to provide notification via the higher-level device.

In a tenth aspect, the first error detection code is generated outside (an external unit) the control unit and is input to the control unit together with image data. As the first error detection code has been already generated, it does not need to be generated by the control unit. The control unit transmits only the image data or both the image data and the first detection code to the display drive unit. In the display drive unit, the error-detection code generating unit generates the second error detection code based on the received image data (in this case, the same as in the first to the ninth aspects), or the error-detection code separating unit separates only the first error detection code from the image data and the first error detection code received and outputs it as the second error detection code. In this case, if data corruption or data loss has occurred in the image data received by the display drive unit due to effects of electromagnetic wave noise, or the like, there is a high possibility that data corruption or data loss has also occurred in the first error detection code received by the display drive unit. Therefore, the separated first error detection code is treated as the second error detection code and it is used to be compared (compare check) with the first error detection code so that a match/mismatch determination is possible. According to the tenth aspect, when the first error detection code is not generated inside the control unit, i.e., when the first error detection code is generated in the process to reach the control unit (e.g., when image data for navigation and the first error detection code added thereto are generated by an external driving support system and is input to the control unit), the error detection codes may be compared (compare check) with each other. Therefore, the same advantage as that in the first to the ninth aspects may be obtained.

In an eleventh aspect according to any one of the seventh to the tenth aspects, the notification-necessity determining unit may determine that notification is necessary when a mismatch has occurred during a predetermined period of time in the match determining unit.

In the eleventh aspect, it is possible to accurately detect whether an error recognizable by the user of the vehicle has occurred in the image on the display by determining whether notification is to be provided in consideration of a mismatch situation over time, and the possibility of the unnecessary notification may be reduced. For example, a mismatch log of error detection codes is stored, and when an error is continuously detected during a predetermined time in which the displayed image is recognizable, the user (person) is notified of an error detection for the first time; this prevents a situation in which a short error, which is difficult for the user to perceive, is notified each time the error occurs. Therefore, the user is not bothered, and thus a practical vehicle display apparatus is achieved.

It should be easily understood by those skilled in the art that the aspects according to the present invention explained as examples may be further modified without departing from the spirit of the present invention.

BRIEF DESCRIPTION OF THE DRAWINGS

FIG. 2(A) is a diagram that illustrates a normal display example on a display.

FIG. 2(B) is a diagram that illustrates an example when the display is being disordered due to disturbance such as noise (a display error occurs).

FIG. 2(C), is a diagram that illustrates notification by lighting, flashing, or the like, the light-emitting elements or the light-emitting element units (indicator LEDs (or LED units)) 6a, 6b that display various types of information as illustrated in FIG. 1(A).

FIG. 13(A) is a diagram that illustrates an example of the configuration of the primary part of the vehicle display apparatus in an example where a first CRC is generated outside the control unit and is input to the control unit.

FIG. 13(B) is a partially extracted view of another example of the configuration of the primary part.

MODE FOR CARRYING OUT THE INVENTION

A preferred embodiment described below is used for easy understanding of the present invention. Therefore, those skilled in the art should note that the present invention is not unduly limited to the embodiment described below.

Figure 1A:
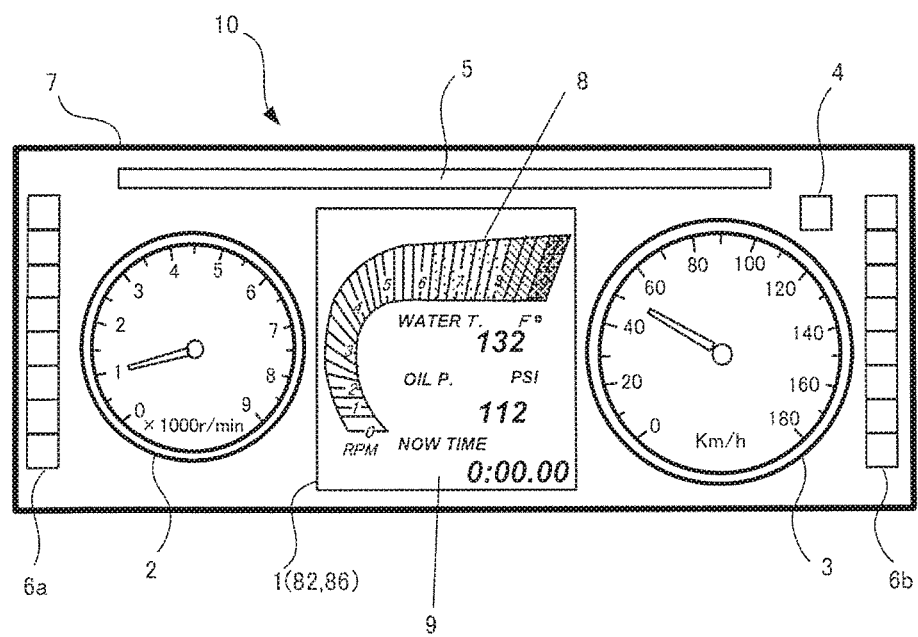
FIG. 1(A) is a front view that illustrates a configuration example of a vehicle display apparatus according to an embodiment of the present invention.
Figures 1B, 1C:
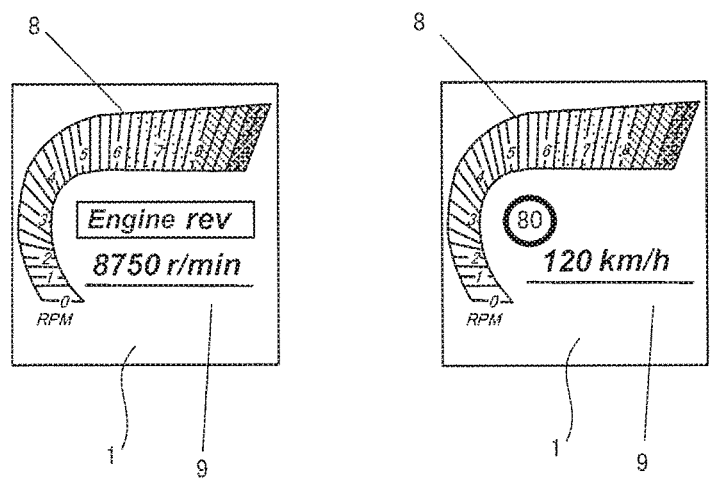
FIG. 1(B) and FIG. 1(C) are diagrams that illustrate display examples of warning information.

First, a reference is made to FIGS. 1(A)-1(C). FIG. 1(A) is a front view that illustrates an example of the structure of the vehicle display apparatus according to an embodiment of the present invention, and FIG. 1(B) and FIG. 1(C) are diagrams that illustrate examples of the display of warning information.

As illustrated in FIG. 1(A), a vehicle display apparatus 10 includes: a liquid crystal display device 1 that is a display unit; analog meters 2, 3 (in this case, the analog meter 2 is a tachometer, and the analog meter 3 is a speedometer) that display vehicle display information by using indicating needles; a light-emitting element or a light-emitting element unit 4 (here, an LED for master warning) having a warning function; a light-emitting element or a light-emitting element unit 5 (here, an LED (or LED unit) for ambient illumination configured by arranging a plurality of LEDs in the lateral direction) having the function to illuminate the surroundings; and light-emitting elements or light-emitting element units (indicator LEDs (or LED units)) 6a, 6b for displaying various types of vehicle information, and they are accommodated in an outer case body 7. Further, the number of analog meters (2, 3) is not specified.

Here, the light-emitting element (LED for master warning) 4 having a warning function, the light-emitting element (the LED (or the LED unit) for ambient illumination configured by arranging a plurality of LEDs in the lateral direction) 5 having the function to illuminate the surroundings, and the indicator LEDs (or LED units) 6a, 6b for displaying various types of vehicle information constitute a light-emitting element unit including at least one light-emitting element.

Further, although not illustrated in FIG. 1(A), the vehicle display apparatus 10 may be configured to include a sound output unit (reference numerals 90, 92 in FIGS. 3 and 4) capable of outputting a buzzer sound, a voice, and the like. That is, the vehicle display apparatus is configured to include any one or both of the light-emitting element unit including at least one light-emitting element and the sound output unit.

Figure 3:
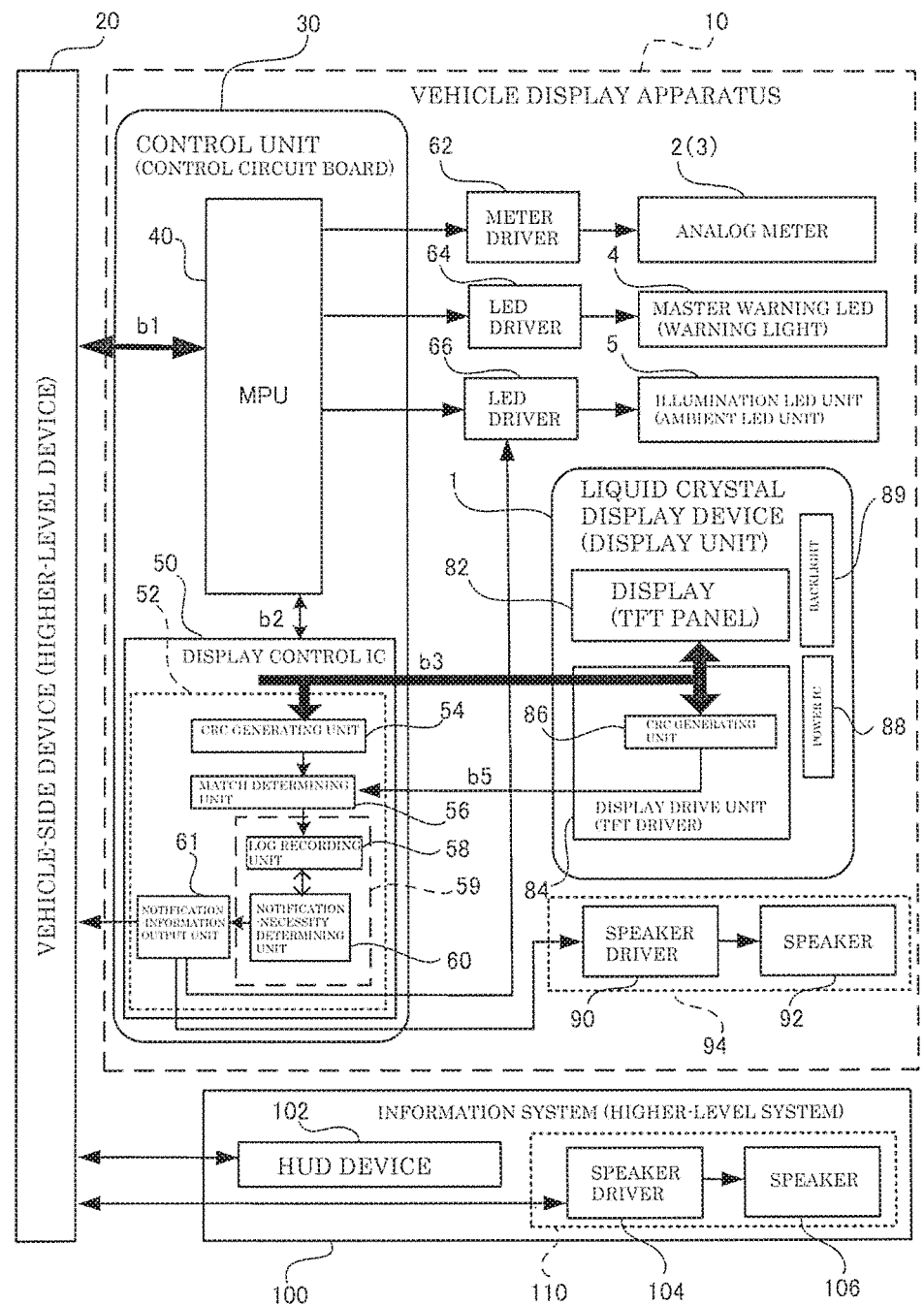
FIG. 3 is a diagram that illustrates the primary configuration (including a functional block) of the vehicle display apparatus and the relationship between the vehicle display apparatus and the higher-level device.
Figure 4:
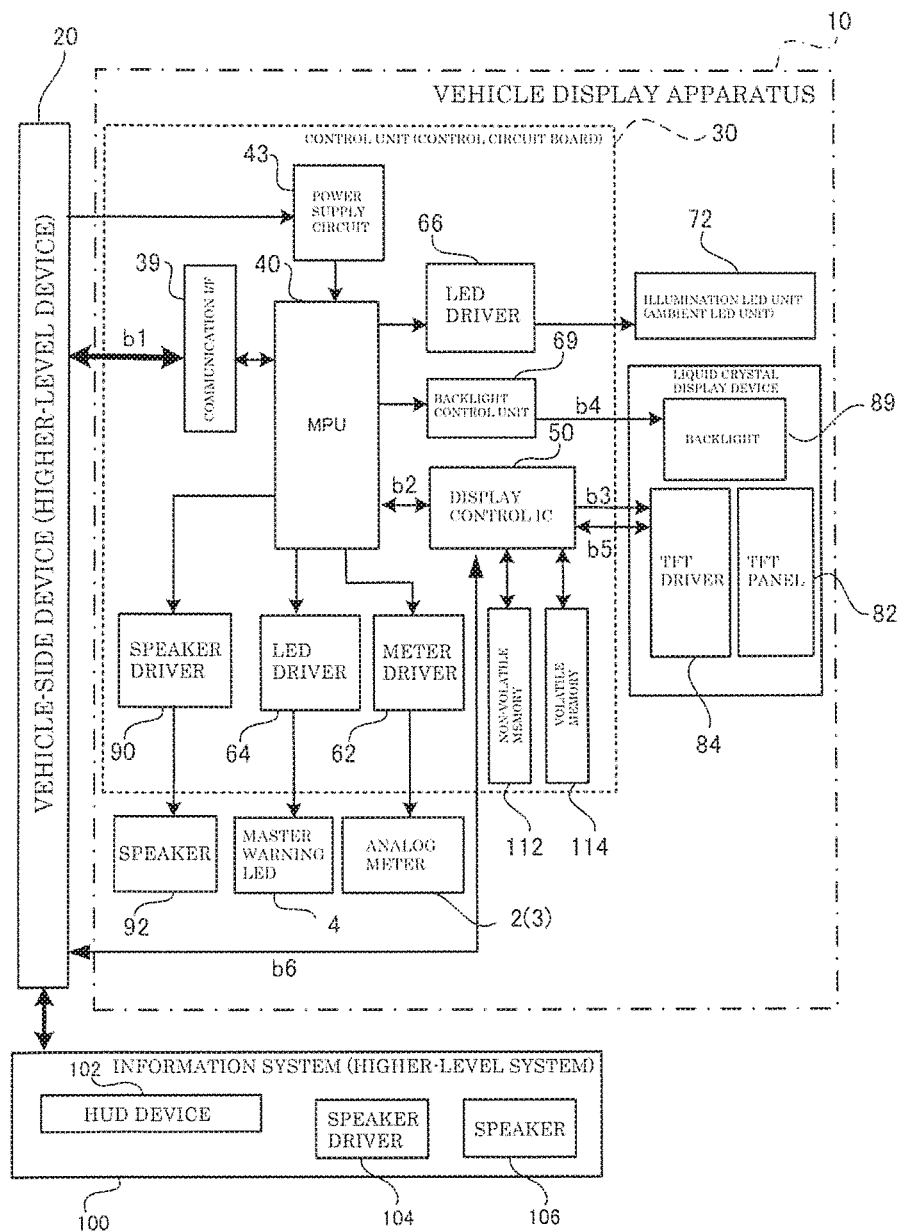
FIG. 4 is a diagram that illustrates a system configuration (hardware configuration) of a vehicle display apparatus.
Figure 5:
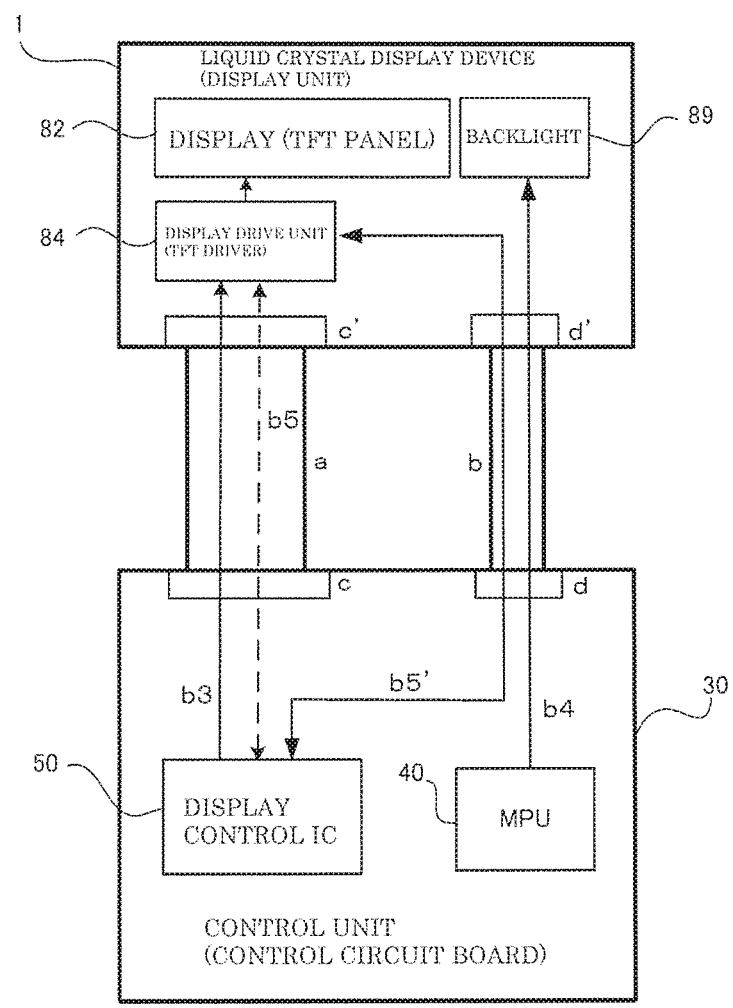
FIG. 5 is a diagram that illustrates the mode of the cable connection between a liquid crystal display device mounted on the vehicle display apparatus and the control unit (control circuit board).

Furthermore, the liquid crystal display device 1, which is a display unit, is capable of color gradation display, and it is configured to include a display (TFT panel: reference numeral 82 in FIG. 2, FIG. 4, and FIG. 5) made of TFT (Thin Film Transistor: thin film transistor); and a backlight (reference numeral 89 in FIG. 3, FIG. 4, and FIG. 5). An image is displayed on the TFT panel 82, and the image is illuminated from the back side by the backlight 89 so that the user (the driver, or the like) of the vehicle can view the image. The TFT panel, which is the display 82, is mounted on the vehicle and forms a display on which vehicle information is displayed.

In the example of FIG. 1(A), a bar graph 8 having substantially a J-shape, horizontally arranged, and indicating the number of revolutions of the engine is displayed on the TFT panel 82 of the liquid crystal display device 1, which is a display unit, and on a digital display area 9 on the inner side (the lower side) of the bar graph 8, the water temperature, the oil pressure, and the lap time are displayed as vehicle information. However, this display example is one example, and this is not a limitation.

In FIG. 1(B), on the digital display area 9, the current number of revolutions of the engine is indicated with a specific numerical value as warning information. Further, in FIG. 1(C), the warning information indicates a significantly excessive speed state, that is, currently 120 km/h on a road with the speed limit of 80 km/h. Here, these display examples are normal display examples with no effects of noise, or the like.

Next, a reference is made to FIG. 2(A) and FIG. 2(B). FIG. 2(A) is a diagram that illustrates the normal display example of the display, and FIG. 2(B) is a diagram that illustrates the example where the display is being disordered (a display error has occurred) due to a disturbance, such as noise.

In FIG. 2(A), the excessive speed is warned by flashing the light-emitting element (the LED for master warning) 4 having a warning function, lighting the color, or the like, and the same event (that is, the event of being in an excessive speed state) is also warned on the TFT panel 82 of the liquid crystal display device 1, which is a display unit.

In such a circumstance, as illustrated in FIG. 2(B), when a disturbance (including the whole loss, partial loss, garbled character, or the like) occurs in the image due to disturbance such as noise and a display error occurs, it is conventionally difficult to take measures; according to the present embodiment, an appropriate warning may be given to the user of the vehicle (the driver, or the like).

It is possible to clearly notify the user that there is a situation where the display is being disordered due to a disturbance such as noise, i.e., there is a situation where the reliability of the image has degraded by, for example, sending a message such as "now, the image is being disordered due to noise" with sound (or giving notification with a buzzer sound, or the like) by using the sound output unit included in the vehicle display apparatus or using an information system included in a higher-level device, displaying warning texts such as "attention-calling mark" and "image disorder warning" on the front window shield, or the like, by using, for example, a HUD device (head-up display device) included in a higher-level device, or by making the light emission state of, for example, the light-emitting element (the LED (or the LED unit) for ambient illumination, which is configured by arranging a plurality of LEDs in the lateral direction) 5 having the function to illuminate the surroundings as illustrated in FIG. 1(A), different from the normal state.

Therefore, when a warning about a certain event is given by a light-emitting element (warning indicator), or the like, functioning as a warning light and, at the same time, a warning is given for the same event by using an image on the display, if an event occurs such that, while the warning indicator is continuously flashed, or the like, the image on the display is significantly disordered due to noise, or the like, the user (the driver, etc.) is able to clearly know that it is not a situation where the event is too serious to enable the display but it is a situation where the display is being disordered due to a disturbance such as noise (i.e., the reliability of the image has degraded). Therefore, it is possible to avoid the occurrence of confusion in the user (the driver, or the like) while driving the vehicle, and the user's anxiety may be reduced. Thus, it is possible to provide useful information that contributes to safe driving, which is conventionally difficult, and to produce unprecedented high-level safe driving environments.

Next, a reference is made to FIG. 3. The figure illustrates the primary structure (including a functional block) of the vehicle display apparatus and the relationship between the vehicle display apparatus and a higher-level device.

The vehicle display apparatus 10 is capable of transmitting and receiving data and signals to and from a vehicle-side device (higher-level device) via a communication line such as a cable or a bus. Here, the higher-level device includes an information system (higher-level system) 100, and the information system 100 includes, for example, a HUD device (head-up display device) 102 and a sound output unit (i.e., a sound output unit provided in the higher-level device) 110 including a speaker driver 104 and a speaker 106. Further, the vehicle display apparatus 10 and the higher-level device 20 (including the information system 100) constitute a single vehicle system as a whole.

The vehicle display apparatus 10 includes a control unit (control circuit board) 30, a meter driver 62 for driving the analog meter 2 (3), an LED driver 64 for driving the master warning LED (warning light) 4, an LED driver 66 for driving the illumination LED unit (it is an ambient LED unit and it may be rephrased as a peripheral illumination unit or an indirect illumination unit) 5, the liquid crystal display device 1, and a sound output unit (in other words, a sound output unit provided in the vehicle display apparatus 10) 104 including a speaker driver 90 and a speaker 92.

The control unit (control circuit board) 30 includes an MPU (micro processing unit) 40 and a display control IC 50.

The display control IC 50 includes, as functional blocks, a CRC generating unit (first CRC generating unit) 54 that generates a CRC code (first CRC code) based on image data to be transmitted to a display drive unit (TFT driver) 84 of the liquid crystal display device (display unit) 1; a match determining unit 56 that performs a match determination by comparing a CRC code (second CRC code) transmitted from a CRC generating unit (second CRC generating unit) 86 included in the display drive unit (TFT driver) 84 with the first CRC code; a log recording unit 58 that registers the status of a match determination result; a notification-necessity determining unit 60 that refers to the log recording unit 58 and determines whether notification to the user of the vehicle is necessary based on the status of a mismatch (the status of occurrence of a mismatch); and a notification-information output unit 61.

Although an explanation is here given of an example in which a CRC code is used as an error detection code, this is not a limitation, and other error detection codes such as Hamming codes may be also used.

The notification-necessity determining unit 60 refers to the log recording unit 58 and determines whether notification is necessary by detecting whether an error recognizable by the user of the vehicle has occurred in the image on the display (TFT panel) 82 based on the situation in which the match determining unit 56 detects a mismatch.

When the notification-necessity determining unit 60 determines that notification is necessary, the notification-information output unit 61 is capable of generating notification information for notifying that the reliability of the image on the display (TFT panel) 82 has degraded and outputting the generated notification information to control the operation of at least one of the illumination LED unit (ambient LED unit) 5, which forms the light-emitting element unit, and the sound output unit 94 or outputting it to the higher-level device 20 of the vehicle display apparatus via, for example, the signal line b6 to give notification via the higher-level device 20.

That is, the notification-information output unit 61 is capable of sending notification information for notifying that the reliability of the image on the display (TFT panel) 82 has degraded to the higher-level device 20 via the signal line b6, sending the notification information to the speaker driver 90 which is a component of the sound output unit 94 provided in the vehicle display apparatus, and sending the notification information to the LED driver 66 for driving the illumination LED unit (ambient LED unit) 5. Further, transmission of notification information to each unit may be performed individually by selecting the transmission destination or may be performed simultaneously (concurrently) to each unit.

The log recording unit 58 and the notification-necessity determining unit 60 constitute an image-reliability degradation detecting unit 59, and the image-reliability degradation detecting unit 59 is provided in the control unit (control circuit board) 30. Further, the match determining unit 56 may be provided in the display drive unit (TFT driver) 84 of the liquid crystal display device 1 (this point is explained with reference to FIG. 7).

The liquid crystal display device (display unit) 1 includes the TFT panel 82 as a display, the TFT driver 84 as a display drive unit, the backlight 89, and a power IC 88.

The TFT driver 84, which is a display drive unit, includes the second CRC generating unit 86 as a functional block. The second CRC generating unit 86 generates a second CRC code based on the image data (i.e., the image data received by the TFT driver 84) transmitted from the control unit (display control IC).

The MPU 40 is capable of communicating data, signals, and various types of information with the higher-level device 20 via the signal line b1. Further, the MPU 40 is capable of communicating data, signals, and various types of information with the display control IC 50 via the signal line b2.

Furthermore, the display control IC 50 is capable of transmitting (transferring) image data to the display drive unit (TFT driver) 84 via the signal line (e.g., bus) b3.

Moreover, the second CRC generating unit 86 included in the liquid crystal display device 1 is capable of sending the generated second CRC code to the match determining unit 56 in the display control IC 50 via the signal line b5.

Next, a reference is made to FIG. 4. FIG. 4 is a diagram that illustrates a system configuration (hardware configuration) of the vehicle display apparatus. In FIG. 4, the same parts as those in FIG. 3 are given the same reference numerals. In FIG. 4, newly added components (components that are not illustrated in FIG. 3) are a communication interface (described as communication I/F in the drawing) 39, a power supply circuit 43, a backlight control unit 69, a non-volatile memory 112, and a volatile memory 114.

The communication interface 39 is an input/output unit that is used when the MPU 40 exchanges data, and the like, with the vehicle-side device (higher-level device) 20. The power supply circuit 43 supplies a power supply voltage to the MPU 40 (and each unit such as the display control IC 50). Further, the backlight control unit 69 drives the backlight 89 of the liquid crystal display device 1. The non-volatile memory 112 and the volatile memory 114 constitute a memory unit that is usable by the display control IC 50. The log recording unit 58 illustrated in FIG. 3 is configured by using the memory unit. Further, the non-volatile memory 112 and the volatile memory 114 are incorporated in the display control IC 50 in some cases.

Next, a reference is made to FIG. 5. FIG. 5 is a diagram that illustrates the mode of the cable connection between the liquid crystal display device 1 mounted on the vehicle display apparatus and the control unit (control circuit board) 30.

The control unit (control circuit board) 50 includes a connector c to which a cable a (first cable) is connected and a connector d to which a cable b (second cable) is connected. The liquid crystal display device (display unit) 1 includes a connector c' to which the cable a is connected and a connector d' to which the cable b is connected. The cable a is an image data cable for communicating image data, and the cable b is originally a backlight cable for communicating control information on the backlight 89.

Furthermore, in addition to display image data on one screen, various kinds of image data may be assumed, such as continuous images such as animation images, moving image files, navigation information, or camera images.

In the example of FIG. 5, the control unit (control circuit board) 30 and the display drive unit (TFT driver) 84 are connected to each other via the cable a, which is the first cable, and the cable b, which is the second cable different from the first cable.

That is, when the control unit (control circuit board) 30 transmits image data to the display drive unit (TFT driver) 84, the image data is transmitted via the signal line b3 passing through the cable a, which is the first cable.

When the display drive unit (TFT driver) 84 transmits the above-described second CRC code (second error detection code) to the control unit (control circuit board) 30 or when the display drive unit (TFT driver) 84 transmits information indicating a result of a match determination by the match determining unit to the control unit (control circuit board) 30 in the example (FIG. 7) in which the above-described match determining unit 56 is provided in the display drive unit (TFT driver) 84, it is transmitted via the signal line b5' passing through the cable b, which is the second cable.

Further, when the control unit (TFT driver) 84 transmits the above-described first CRC code (first error detection code) to the display drive unit (TFT driver) 84 in the example (FIG. 7) in which the match determining unit 56 is provided in the display drive unit (TFT driver) 84, it is transmitted via the signal line b5' passing through the cable b, which is the second cable. Moreover, when the MPU 40 transmits a signal for controlling the backlight 89, it is transmitted through the signal line b4 passing through the cable b which is the second cable.

In this manner, in the example of FIG. 5, the cable (here, the cable a) having the passing signal line b3 used for transmitting image data is different from the cable (here, the cable b) having the passing signal line b5' for performing communications of information necessary to determine whether an error has occurred in the image displayed on the display (TFT panel) 82 (in other words, information necessary to determine whether the reliability of image data has degraded), whereby it is possible to reduce the extent to which information (signal) necessary for a determination is adversely affected by noise, or the like, and thus it is possible to ensure the reliability of the determination.

Specifically, when the cable a is electrically affected by external noise, or the like, the entire signal line of the cable a is affected. When the signal line b5 (indicated by a broken arrow in the figure) is used to transmit information (signal) necessary for the above determination, the signal line b5 is also likely to be affected, and therefore, for example, there is a high possibility that the reliability of CRC code data or information (signal) indicating a result of a match determination, communicated via the signal line b5, is also reduced.

In the example of FIG. 5, as the signal line b5' is wired via the cable b for backlight control, there is a higher possibility that the signal line b5' may avoid an electrical effect such as noise received by the cable a to a minimum, and the accuracy of error detection using a CRC code (i.e., detection of the occurrence of image corruption or loss in an image displayed on the display 82) is improved.

In this way, the cable for transmitting image data is separated from the cable for communicating information (signal) necessary to determine whether the reliability of the image data has degraded; therefore, it is possible to reduce the extent to which information (signal) necessary for a determination is adversely affected by noise, or the like, and it is thus possible to ensure the reliability of a determination.

Further, by using a cable for backlight control in the liquid crystal display device (display unit) 1 as the cable b, it is not necessary to separately provide a cable different from the cable a, and therefore an advantage is produced such that the load on the design of a connector is not increased.

Figure 6:
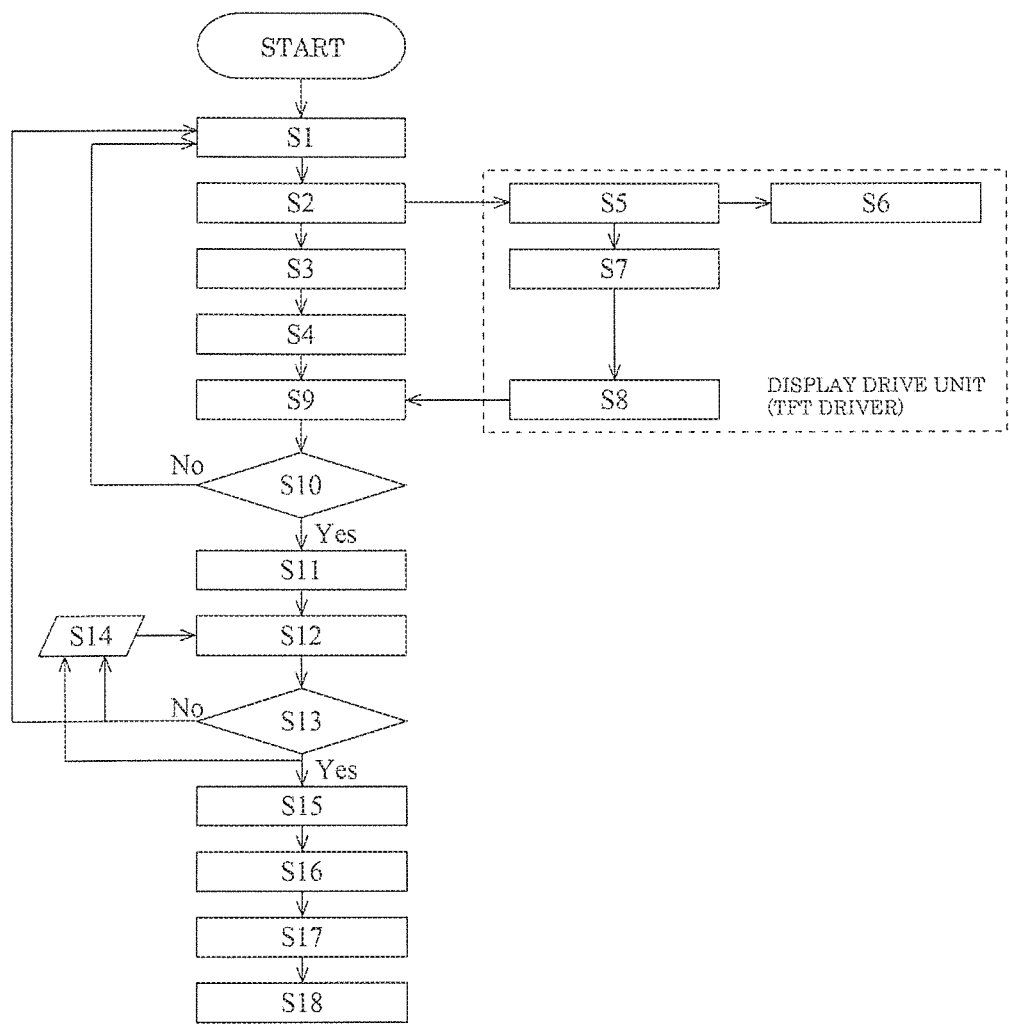
FIG. 6 is a flowchart that illustrates the primary procedure in the case where the control unit performs a match determination on CRC codes.

Next, a reference is made to FIG. 6 (and FIG. 3). FIG. 6 is a flowchart that illustrates the primary procedure in the case where the control unit performs a match determination on CRC codes.

First, the display control IC 50 generates image data (drawing data) (Step S1) and transmits (transfers) the image data to the liquid crystal display device (display unit) 1 (Step S2). Then, the first CRC generating unit 54 in the display control IC 50 generates a first CRC code based on the image data to be transmitted to the liquid crystal display device (display unit) 1 (Step S3) and delivers the generated first CRC code to the compare processing unit (Step S4).

Steps S5 to S8 are operations in the display drive unit (TFT driver) 84 in the liquid crystal display device (display unit) 1. The display drive unit (TFT driver) 84 receives the image data (Step S5) and drives the display (TFT panel) 82 based on the image data (Step S6). Furthermore, the second CRC generating unit 86 generates a second CRC code based on the received image data (Step S7) and transmits the second CRC code to the control unit (control circuit board) 30 using, for example, serial communication (Step S8). Further, the equation used to generate the second CRC code need to be the same as the equation used to generate the first CRC code.

The match determining unit 56 in the control unit (control circuit board) 30 performs a match determination (compare check) (Step S9), checks the presence or absence of a compare error (mismatch error) (Step S10), returns to Step S1 in the case of N at Step S10, records the occurrence of a compare error of the CRC code in the system in the case of Y (Step S11), and analyzes the error content (Step S12).

Then, the presence or absence of successive errors is checked (Step S13), the result is recorded as a data log (Step S14), and Step 1 is returned in the case of N at step S13.

Here, various criteria may be considered as the one for determining that there are successive errors at step S13. For example, it is also assumed that a mismatch between CRC codes temporarily proceeds and continues for a predetermined period of time (situation A) or it is also assumed that a mismatch is detected continuously during a certain period of time, returns to the normal afterward, and then immediately a mismatch is detected continuously during a certain period of time (situation B).

A CRC code is generable, for example, on a frame-by-frame basis (or in the units of a plurality of frames) based on the entire (or partial) image data on each frame, and for example, when a mismatch is detected only once, i.e., when the image is disordered for one frame period (1/60 second), the disturbance of the image is not recognizable (visually recognizable) by the user of the vehicle and therefore it is considered that no particular problem occurs. A problem arises when an error recognizable (visually recognizable) by the user occurs, and in this case, it is generally considered that a mismatch error has occurred during a certain period of time (i.e., a predetermined period of time), and there is a high possibility that, in the above-described situation A and situation B, too, it is considered that a mismatch error has occurred during a predetermined period of time. In consideration of this aspect, during detection of successive errors at Step S13, it is preferable that the status of a mismatch error is carefully determined by referring to the temporal log record during the predetermined period of time and, for example, taking into consideration the occurrence frequency of successive mismatch errors occurring during the predetermined period of time so as to prevent unnecessary notification.

That is, the notification-necessity determining unit 60 in FIG. 3 performs an error detection and determines whether notification is necessary in terms of whether an error recognizable by the user of the vehicle has occurred in the image on the display (TFT panel) 82 based on the situation where a mismatch is detected by the match determining unit 56.

In FIG. 6, when it is detected that successive mismatch errors of CRC codes (display errors recognizable by the user) have occurred (Step S15), the occurrence of the error is notified to the notification-information output unit 61 (Step S16), and then the notification means is determined (Step S17). That is, it is determined whether, for example, notification is made by the sound output unit 94 of FIG. 3, notification is made by changing the light emission state of the illumination LED unit (ambient LED unit) 5, notification is made by using the information system (the higher-level system) via the higher-level device 20, or other means are used.

Then, based on the notification information output from the notification-information output unit 61, the determined notification means notifies the user that there is a situation where the reliability of the image has degraded (Step S18).

Figure 7:
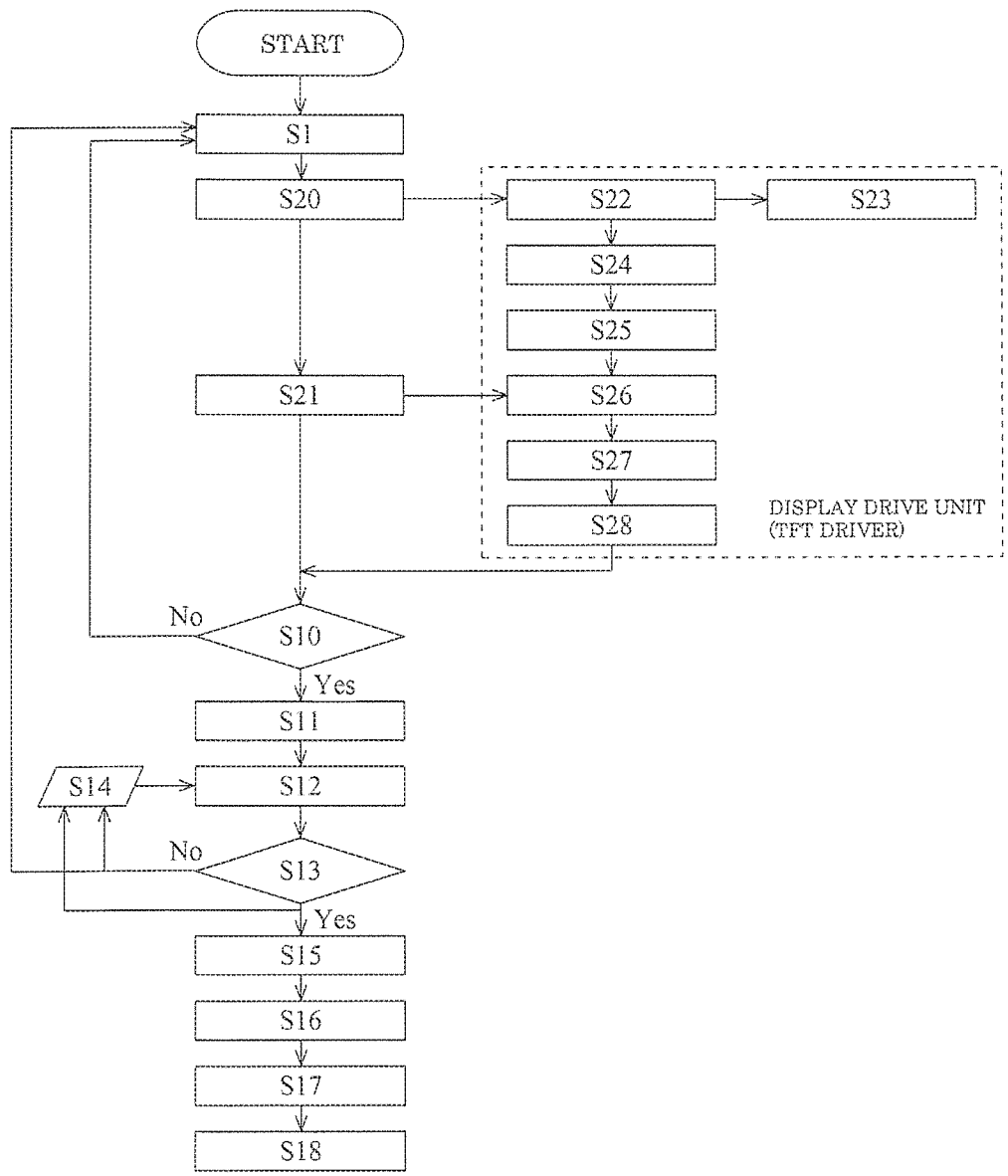
FIG. 7 is a flowchart that illustrates the primary procedure in the case where the display drive unit (TFT driver) performs a match determination on CRC codes.

Next, a reference is made to FIG. 7. FIG. 7 is a flowchart that illustrates the primary procedure in the case where the display drive unit (TFT driver) performs a match determination on CRC codes. In the procedure of FIG. 7, some of the operations in FIG. 6 are performed on the side of the display drive unit (TFT panel) 84.

The side of the display drive unit (TFT panel) 84 transmits image data to the side of the liquid crystal display device (display unit) 1 (Step S20) and generates a first CRC code based on the image data (Step S21).

The display drive unit (TFT panel) 84 receives the image data (Step S22) and drives the display (TFT panel) 82 based on the image data (Step S23). Further, a second CRC code is generated based on the received image data (Step S24) and the second CRC code is transferred to the compare processing unit (Step S25). Then, the first CRC code transmitted from the side of the control unit (control circuit board) 30 is received and stored in the compare check area (Step S26).

Then, compare check (match determination) between the first CRC code and the second CRC code is performed (Step S27), and the compare check result (match determination result) is sent (notified) to the side of the control unit (control circuit board) 30 (Step S28). In the example of FIG. 7, an advantage is produced such that the processing load on the control unit (control circuit board) 30 is reduced.

As described above, according to the embodiment of the present invention, the vehicle display apparatus enables proper notification without causing any confusion to the user of the vehicle even when an error has occurred in the image on the display. Therefore, the user (the driver, or the like) is not confused while driving the vehicle, and the user has less feeling of anxiety. Therefore, it is possible to provide useful information contributing to safe driving, which is conventionally difficult, and it is possible to realize unprecedented high-level safe driving environments. Here, the vehicle allows a wide range of interpretation. The present invention is widely applicable as a display apparatus for movable machines.

Figure 8:
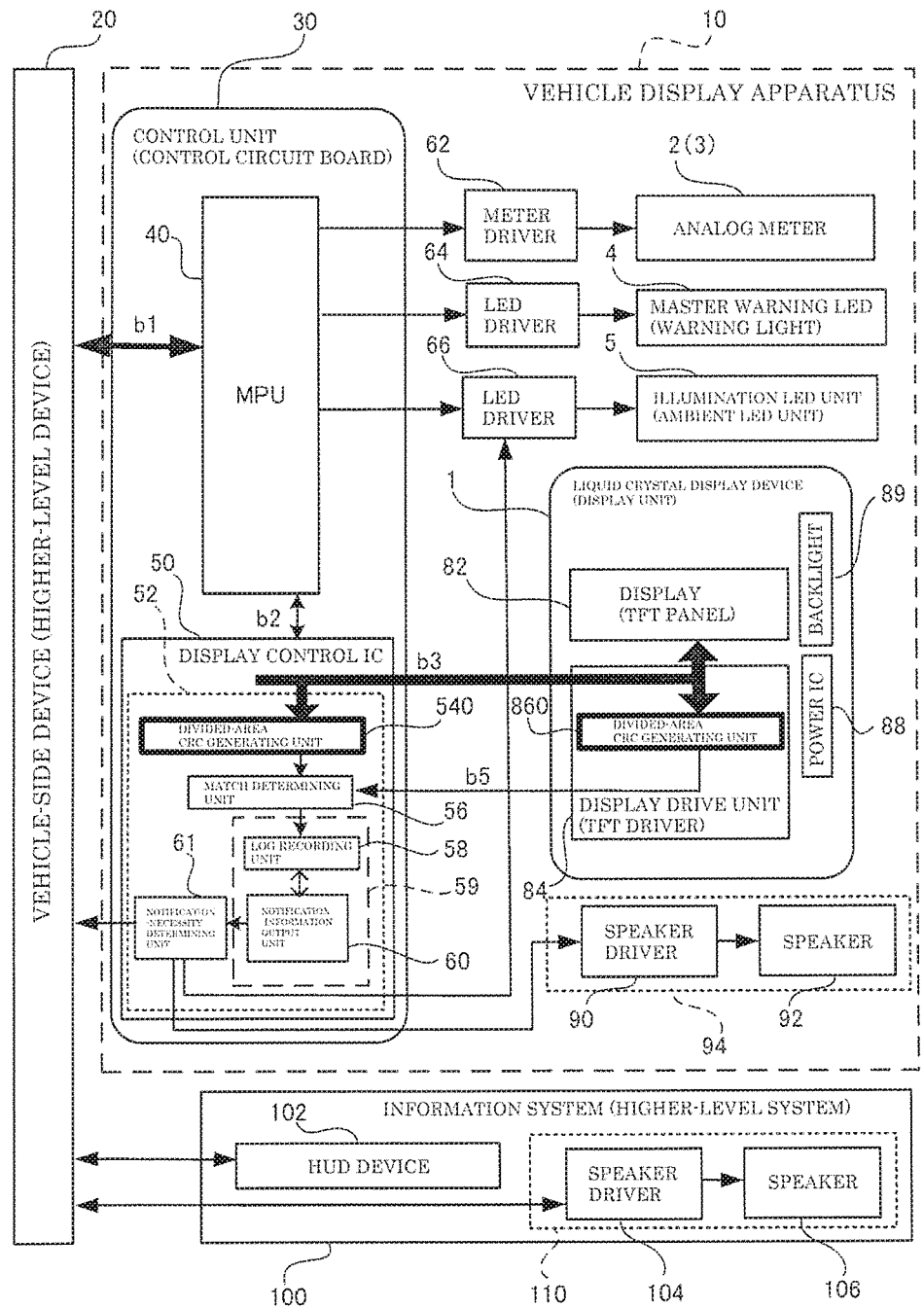
FIG. 8 is a diagram that illustrates the primary configuration (including a functional block) in another example of the vehicle display apparatus and the relationship between the vehicle display apparatus and the higher-level device.

FIG. 8 is a diagram that illustrates the primary configuration (including a functional block) in another example of the vehicle display apparatus and the relationship between the vehicle display apparatus and the higher-level device. FIG. 8 is a diagram corresponding to FIG. 3, and the same parts as those in FIG. 3 are attached with the same reference numerals. Explanation for the same parts is omitted. Further, in order to clarify the difference from the configuration of FIG. 3, blocks in FIG. 8 different from those in FIG. 3 are described with heavy lines in a highlighted manner.

FIG. 8 is substantially the same as FIG. 3 in terms of the overall basic configuration; however, FIG. 8 is different in that "the CRC generating units 54, 86" in FIG. 3 are replaced with "divided-area CRC generating units 540, 860", respectively. In the configuration used in the example of FIG. 8, one screen displayed on the display (TFT panel) 82 is divided into a plurality of areas, and the divided-area CRC generating units 540, 860 (corresponding to a first error-detection code generating unit, a second error-detection code generating unit) generate first and second error-detection codes (here, the first and the second CRC codes) as "error detection codes for an area specified on a section-by-section basis after division"), and the match determining unit 56 determines the match between the first and the second error detection codes (the first and the second CRC codes) for the specified area. In the example of FIG. 3, the first and the second error detection codes (the first and the second CRC codes) are for the single screen in whole; however, in the example of FIG. 8, the first and the second error detection codes (the first and the second CRC codes) function as "error detection codes for the area specified on a section-by-section basis after division".

For example, when one screen is divided into sixteen, an error detection code may be generated for each "1/16 area (it is one section after division)". In this case, the "1/16 area" is the specified area. Furthermore, for example, "the group of four areas, i.e., 4/16 areas" may be specified as one area (for example, one area is specified by using the coordinates on the display surface of the display), and one error detection code may be generated for the "4/16 area". In the example of FIG. 8, it is possible to detect that the reliability is reduced in a specific area of the display screen. Therefore, with regard to a decrease in the reliability of the display screen, it is possible to provide notification with higher accuracy, in other words, notification by clearly indicating in which area a problem has occurred.

For example, as the reliability may be checked by focusing on the display area having a particularly high degree of importance on one screen, it is possible to provide notification of more accurate and useful information. In other words, useful information contributing to safe driving, which is conventionally difficult, may be provided, and unprecedented high-level safe driving environments are achieved.

Figure 9:
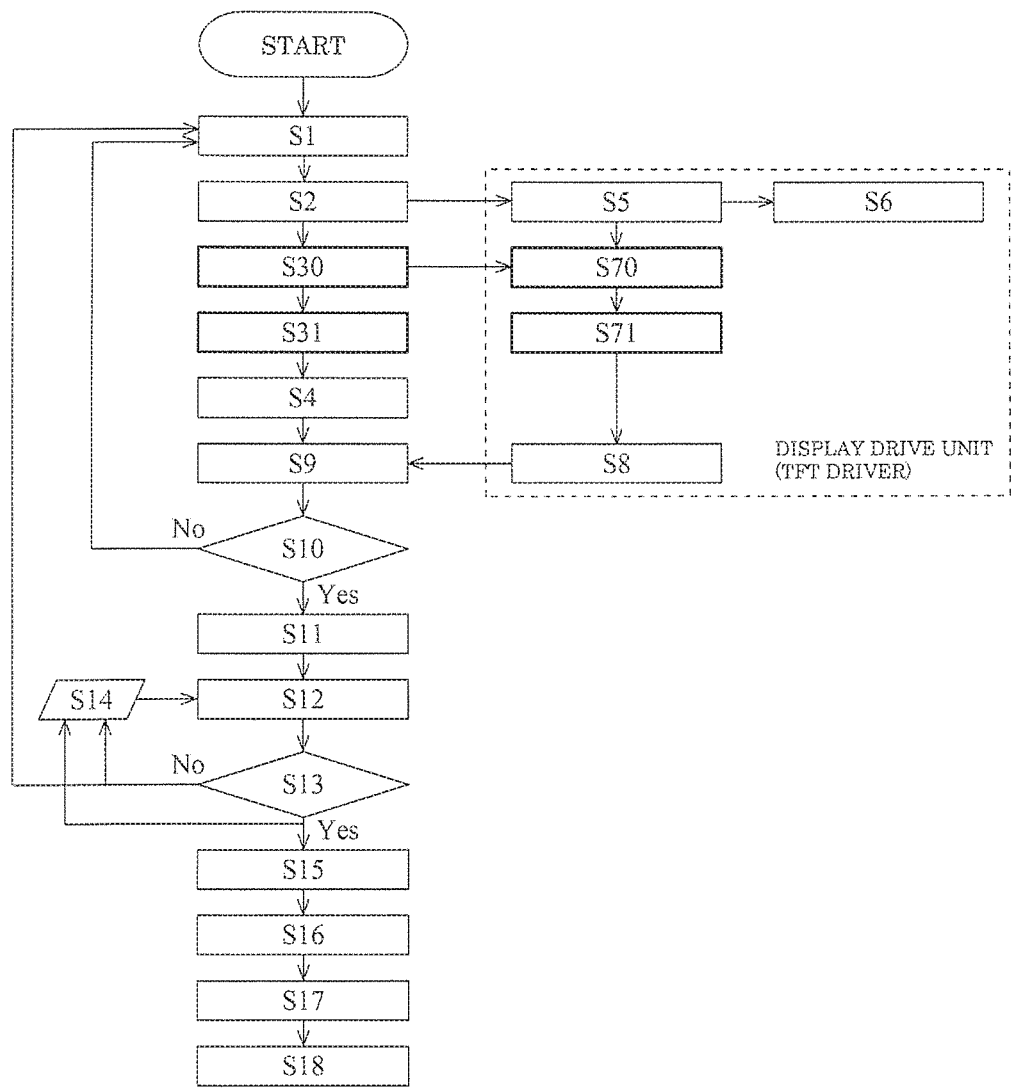
FIG. 9 is a flowchart that illustrates the primary procedure in the case where the control unit performs a match determination on CRC codes in the vehicle display apparatus of FIG. 8.

Next, a reference is made to FIG. 9. FIG. 9 is a flowchart that illustrates the primary procedure in the case where the control unit performs a match determination on CRC codes in the vehicle display apparatus of FIG. 8. FIG. 9 is a diagram corresponding to FIG. 6, and the same steps as those in FIG. 6 are attached with the same reference numerals. Explanation for the same steps is omitted. Further, in order to clarify the difference from the configuration of FIG. 6, the steps in FIG. 9 different from those of FIG. 6 are described in heavy lines in a highlighted manner.

FIG. 9 is substantially the same as FIG. 6 in terms of the overall basic operation; however, in FIG. 9, "Step S3 of FIG. 6" is replaced with "Steps S30, S31" and "Step S7" is replaced with "Steps S70, S71". Here, Step S30 in FIG. 9 is "a step of transmitting area coordinates for generating a CRC code from the side of the control unit 30 (i.e., the display control IC 50) to the side of the display drive unit (TFT driver) 84". Further, Step S31 is "a step of generating a CRC code from the image data on the area (region) specified by the side of the control unit 30 (however, including, as needed, a case where the priority order is determined and the CRC code generation rate is adjusted)". The process including a determination on the priority order is described later.

Furthermore, Step S70 in FIG. 9 is "a step of clipping image data on the area (region) in accordance with the transmitted image data on the area at the side of the display drive unit 84". Further, Step S71 of FIG. 9 is "a step of generating a CRC code from the image data on the clipped area at the side of the display drive unit 84 (however, including, as needed, a case where the priority order is determined and the CRC code generation rate is adjusted)".

In the example of FIG. 8, at Steps S30, S70, the area coordinates indicating the specific area for which a CRC code is to be generated (for example, in the case of a rectangular area, the coordinates of the four vertices corresponding to the orthogonal coordinate system on the display surface of the display) are transmitted and received. Then, at Steps S31, S71, generation of a CRC code based on image data is performed on the side of the control unit 30 and the side of the display drive unit 84 for the specific area. Then, at Step S9, the generated two CRC codes are compared with each other.

When it is detected, as a result of the comparison, that a mismatch has occurred between the CRC codes, the user is notified by the notification means that the reliability of the display has been lowered through Steps S10 to S18. This point has been described above with reference to FIGS. 2(A)-2(C), and the like. The mode of notification includes making notification by lighting or flashing the light-emitting element or the light-emitting element unit (the LED (or LED unit) for ambient illumination) 5 having a function to illuminate the surroundings as illustrated in, for example, FIG. 2(C), making notification by lighting, flashing, or the like, the light-emitting elements or the light-emitting element units (indicator LEDs (or LED units)) 6a, 6b that display various types of information as illustrated in FIG. 1(A), making notification with sound via the speaker 92 as illustrated in FIG. 2(C), and making notification by using the display, or the like, via the higher-level system 100 such as the HUD device 102 as illustrated in FIG. 2(C) and FIG. 3. In other words, at least one of the various notification modes as described above may be adopted for notification.

Further, in FIG. 9, acquisition of a data log (Step S14) and analysis based on the acquired data log (Step S12) are performed, and this is because it is determined whether an error has continuously occurred during a certain period of time (e.g., one frame period) and accordingly notification is given to the user; if notification is given each time a CRC code error occurs, notification is made even in the case of a short-time error that is not recognizable by the user, which results in an increase in inconvenience. In other words, the notification-necessity determining unit 80 in FIG. 8 determines that notification is necessary only when a mismatch has occurred during a predetermined period of time in the match determining unit 56. As described above, it is possible to accurately detect whether an error recognizable by the user has occurred in the image on the display (such as the TFT panel) 82 by determining whether notification is to be provided in consideration of a mismatch situation over time, and therefore the possibility of unnecessary notification may be reduced. For example, as described above, a mismatch log of error detection codes is stored, and when an error is continuously detected during a predetermined time in which the displayed image is recognizable, the user (person) is notified of an error detection for the first time; this prevents a situation in which a short error, which is difficult for the user to perceive, is notified each time the error occurs. Therefore, the user is not bothered, and thus a practical vehicle display apparatus is achieved. This aspect is also applicable to the embodiment described below.

Figure 10:
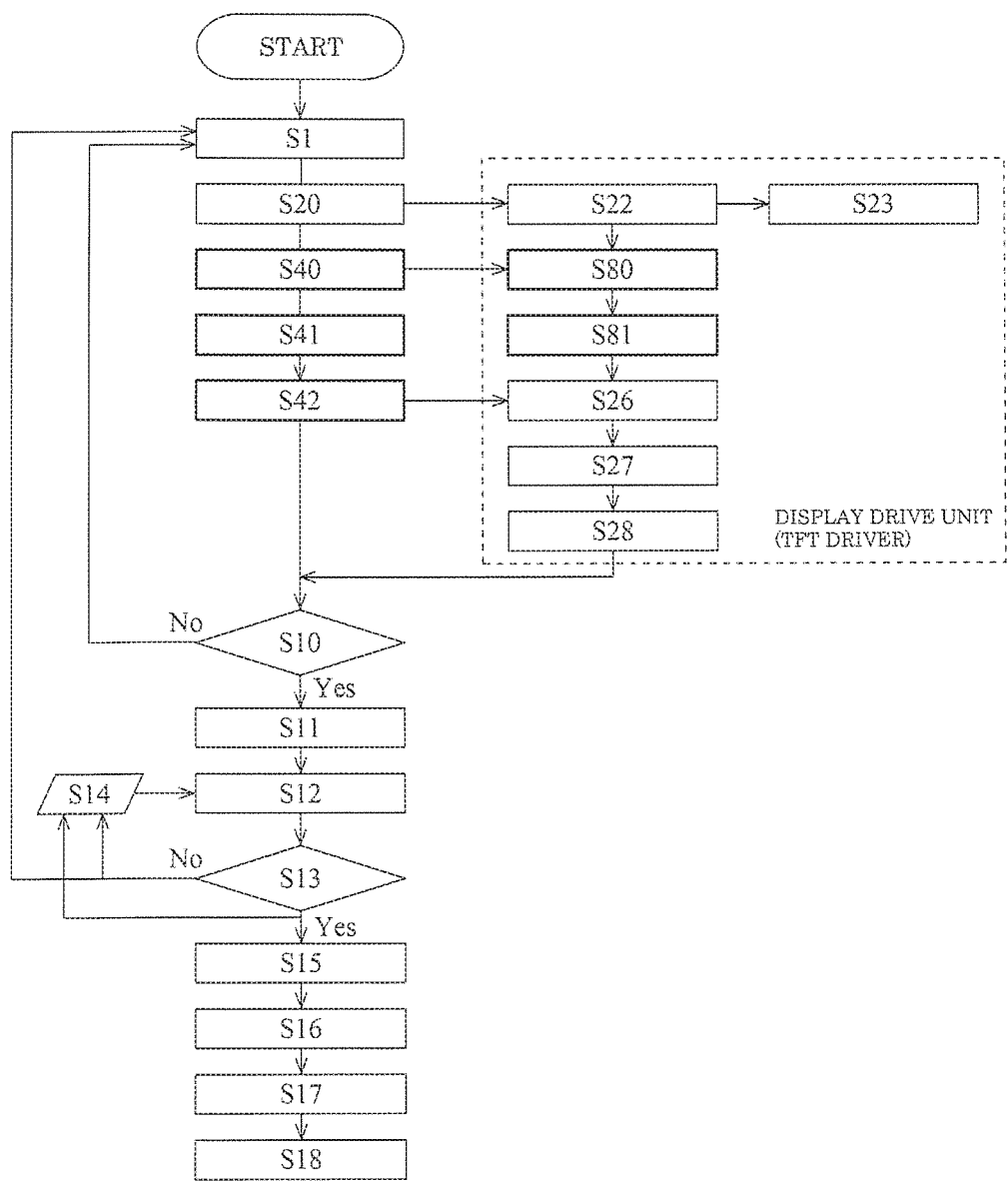
FIG. 10 is a flowchart that illustrates the primary procedure in the case where the display drive unit (TFT driver) performs a match determination on CRC codes in the vehicle display apparatus of FIG. 8.

Next, a reference is made to FIG. 10. FIG. 10 is a flowchart that illustrates the primary procedure in the case where the display drive unit (TFT driver) performs a match determination on CRC codes in the vehicle display apparatus of FIG. 8. FIG. 10 is a diagram corresponding to FIG. 7, and the same steps as those in FIG. 7 are attached with the same reference numerals. Explanation for the same steps is omitted. Further, in order to clarify the difference from the configuration of FIG. 7, the steps in FIG. 10 different from those in FIG. 7 are described with heavy lines in a highlighted manner.

FIG. 10 is substantially the same as FIG. 7 in terms of the overall basic operation; however, in FIG. 10, with regard to the process at the side of the control unit 30, "Steps S40, S41" are added after Step S20, and "Step S21 of FIG. 7" is replaced with "Step S42". Further, with regard to the process at the side of the display drive unit 84, "Steps S24, S25 in FIG. 7" are replaced with "Steps S80, S81". In FIG. 10, as is the case with FIG. 9, a process is performed to generate a CRC code for the area specified by the area coordinates (however, including adjustment on the CRC code generation rate based on a determination of the priority order, which is executed as needed) and compare (compare check) the first and the second CRC codes for the specified area.

Figure 11:
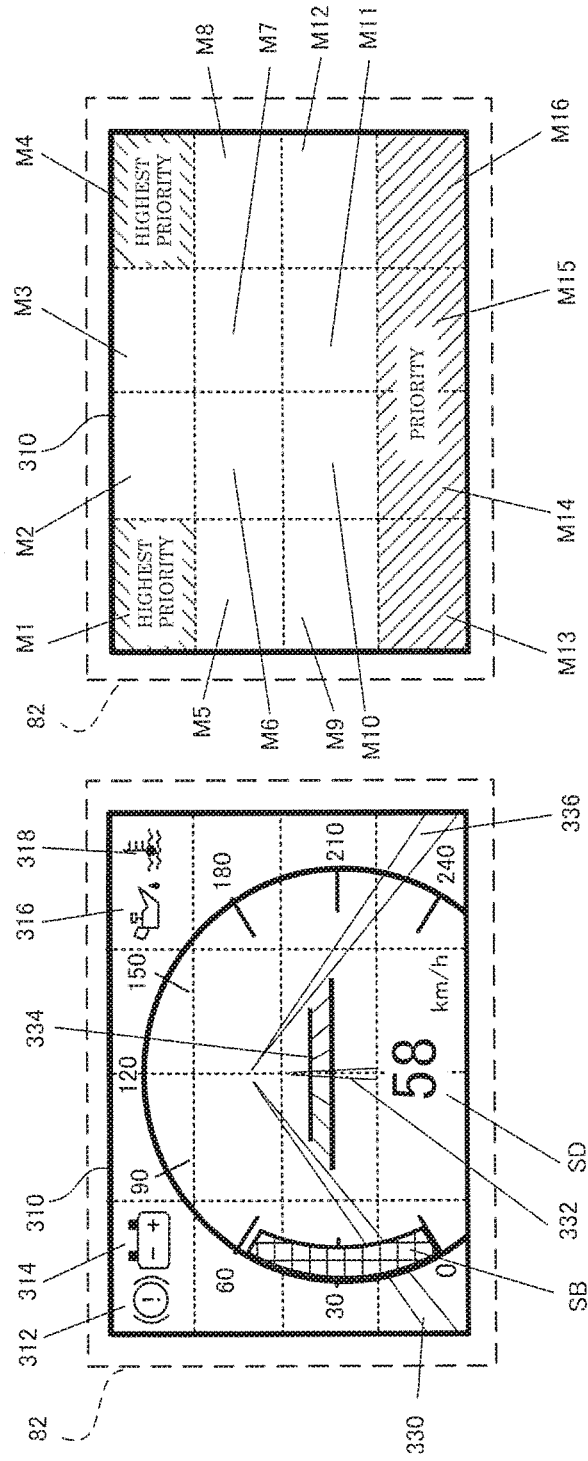
FIG. 11(A) is a diagram that illustrates an example of the relation between the priority order and the number of generated codes in the example of adjustment on the CRC code generation rate in accordance with the priority order on an area-by-area basis after division.
FIG. 11(B) is a diagram that illustrates an example of division of one screen and an example of the display on one screen.
FIG. 11(C) is a diagram that illustrates an example of assignment of the priority order on an area-by-area (section-by-section) basis after division on one screen.

Next, a reference is made to FIGS. 11(A)-11(C). FIG. 11(A) is a diagram that illustrates an example of the relation between the priority order and the number of generated codes in the example of adjustment on the CRC code generation rate in accordance with the priority order on an area-by-area basis after division, FIG. 11(B) is a diagram that illustrates an example of division of one screen and an example of the display on one screen, and FIG. 11(C) is a diagram that illustrates an example of assignment of the priority order on an area-by-area (section-by-section) basis after division on one screen. In the example of FIGS. 11(A)-11(C), each of the divided-area CRC generating units 540, 860 illustrated in FIG. 8 adjusts the number of times a CRC code is generated per unit time in accordance with the priority order determined based on the importance of the display at the specified area.

Specifically, in accordance with the degree of importance of the displayed content in one screen, the priority order for the specified area is determined (in other words, the priority order is assigned); for example, the larger number of times the CRC code is generated per unit time is set, i.e., a higher CRC code generation rate is set, for an area with a high priority order as compared with an area with a low priority order. This makes it possible to set a high detection accuracy for display errors (drawing errors) for the display of content with a high degree of importance, and a low CRC code generation rate may be set for an area with a relatively low degree of importance so that it is possible to reduce the load (i.e., the processing load for an error detection code) on the device (a control circuit board, or the like, forming the control unit 30) involved in the CRC code generation process, the comparison process (compare check process), etc. Further, determination (assignment) of the priority order may be performed corresponding to, for example, a plurality of classes (e.g., classes such as "highest priority", "priority", "minimum processing", "processing unnecessary") according to a predetermined criterion.

Here, a reference is made to FIG. 11(A). In FIG. 11(A), the priority orders are classified as ranks 1 to 4. Classification is such that the rank 1 is "highest priority", the rank 2 is "priority", the rank 3 is "CRC code generation necessary (minimum processing)", and the rank 4 is "CRC code generation unnecessary (processing unnecessary)". When the image update rate is 60 frames/second (S), the number of generated CRC codes (i.e., the CRC code generation rate) is 60 times/second, i.e., generation is performed in each frame, in the case of the rank 1 "highest priority". In the case of the rank 2 "priority", it is 10 times/second (S), i.e., generation is performed once per 0.1 second. In the case of the rank 3 "CRC code generation necessary (minimum processing)", it is one time/second, i.e., generation is performed once per second. In the case of the rank 4 "CRC code generation unnecessary (processing unnecessary)", it is 0 time/second, i.e., no check using the CRC code is performed. Furthermore, the target area for the rank 4 (the lowest priority order) is, for example, a previously determined black area (an area having substantially no display) or an area of the start screen (opening logo) of the meter displayed when, for example, the ignition switch is turned on.

Next, a reference is made to FIG. 11(B). In FIG. 11(B), the display (TFT panel) 82 is used to implement a combined meter (meter panel) 310 capable of displaying the vehicle speed, and the like. The meter (meter panel) 310 is basically what is called a speedometer capable of displaying the vehicle speed by using a bar graph SB arranged along the circumference; however, it is also capable of displaying various other types of information. Moreover, the meter (meter panel) 310 is divided into 16 rectangular regions (areas). Here, a reference is made to FIG. 11(C). As clearly illustrated in FIG. 11(C), one screen is divided into 16 areas of M1 to M16.

As described above in FIG. 9 and FIG. 10, "the divided-area CRC generating unit 540 (see FIG. 8)" included in the control unit 30 designates (specifies) the coordinates of the specific region (specific area) on a section-by-section basis after division so that it is possible to generate a CRC code for each area in each of the control unit 30 and the display drive unit 84.

In the example of FIG. 11(B), the road ahead of the vehicle is displayed as a background in the area inside the bar graph SB arranged along the circumference (here, roadside zones 330 and 336, a center line 332, and a pedestrian crossing 334 are displayed) and, for example, when a person suddenly jumps out, an attention-calling mark (warning mark) may be displayed over the person, an arrow for navigation may be displayed and superimposed on the road, or a landmark serving as an indicator of driving may be circled. However, in the example of FIG. 11(B), the above display superimposed on the road, or the like, as a background is not made.

Further, in FIG. 11(B), at the lower part of the meter (meter panel) 310, the digital display of "58 km/h" indicating the current vehicle speed is made. Not only the vehicle speed but also various types of vehicle information such as the number of revolutions of the engine may be digitally displayed in areas (areas M13 to M16 in FIG. 11(C)) of the lowermost row of the meter (meter panel) 310.

Furthermore, the upper left area (an area M1 in FIG. 11(C)) of the meter (meter panel) 310 is a warning light indicator area and, here, it is capable of displaying a warning by a brake warning light (brake lamp) 312 for a parking brake and by a charge warning light (battery lamp) 314. Also, the upper right area (an area M4 in FIG. 11(C)) of the meter (meter panel) 310 is capable of displaying a warning by an oil-pressure warning light (engine oil lamp) 316 and by a water-temperature warning light 318 regarding the temperature of the coolant for cooling the engine.

In this case, as illustrated in FIG. 11(C), the areas M1 and M4, which are areas for providing the display by the warning light, are determined to be the "highest priority" of the rank 1, and the areas M13 to M16 for providing the digital display are determined to be "priority" of the rank 2. Further, the area formed by M13 to M16 is here regarded as a single specific area (combined area), and a single CRC code is generated for the area. This allows a reduction in the processing load as compared to the case where a CRC is generated on a section-by-section basis.

As illustrated in FIG. 11(B), other areas (M2, M3, M5 to M12) display the vehicle speed by using the bar graph SB and display the road in the background, and the like, and they are in the state of the normal display; therefore, the other areas (M2, M3, M5 to M12) are determined to be "CRC code generation necessary (minimum processing)" of the rank 3. However, this ranking is an example and may be changed as needed.

Furthermore, with regard to the determination on the priority order described above, for example, each of "the divided-area CRC generating units 540, 860" illustrated in FIG. 8 may determine the content of the clipped image based on the specified area coordinates in accordance with, for example, the prepared priority-order determination criterion. A determination on the priority order based on the content of the clipped image may be performed only by "the divided-area CRC generating unit 540" on the side of the control unit 30. In this case, the determination result is transmitted to the side of the display drive unit 84, and "the divided-area CRC generating unit 860" on the side of the display drive unit 84 checks the transmitted determination result to indirectly (dependently) determine the priority order.

Figure 12:
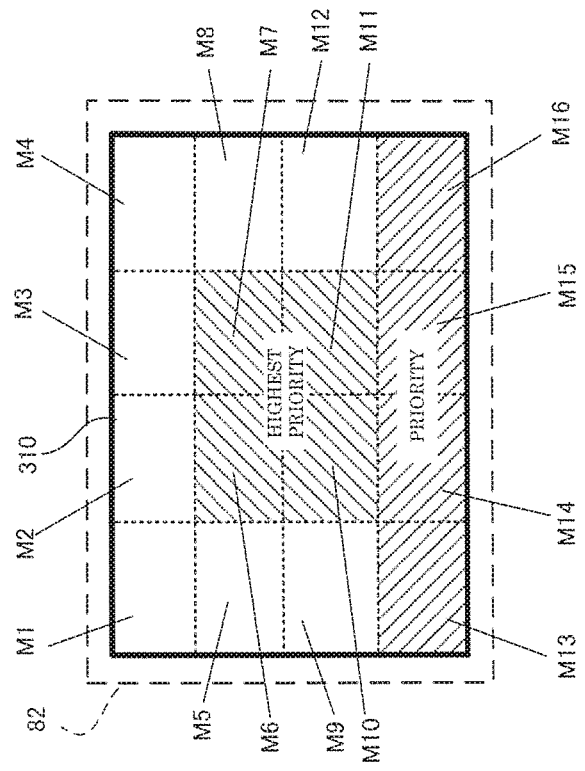
FIG. 12(A) is a diagram that illustrates another example of division of one screen and display of one screen.
FIG. 12(B) is a diagram that illustrates another example of assignment of the priority order on an area-by-area (section-by-section) basis after division on one screen.
Figure 12A:
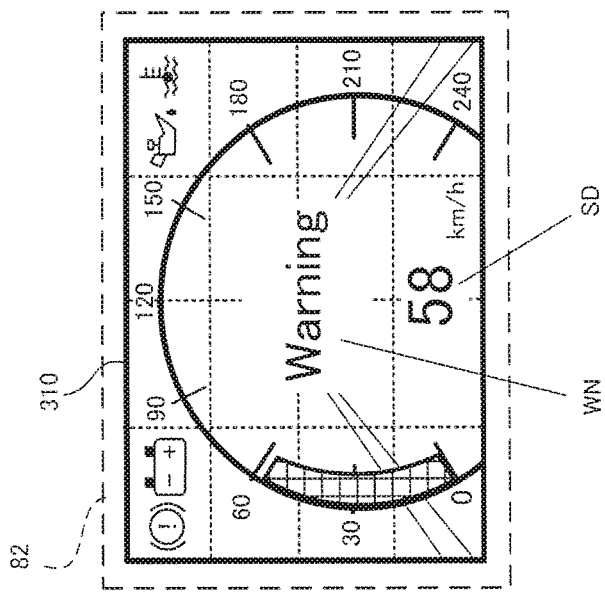

Next, a reference is made to FIGS. 12(A) and 12(B). FIG. 12(A) is a diagram that illustrates another example of division of one screen and display of one screen, and FIG. 12(B) is a diagram that illustrates another example of assignment of the priority order on an area-by-area (section-by-section) basis after division on one screen. In FIG. 12(A), a warning (Warning) indication WN, which is one of the most important indications, is provided at the center of the meter (meter panel) 310. The warning indication WN suddenly cuts into the display content, for example, when the distance to the vehicle ahead rapidly decreases and a braking operation is needed to avoid a collision. In such a case, as illustrated in FIG. 12(B), the area formed by M6, M7, M10, M11, which is the area for providing the warning indication WN, is determined to be the "highest priority" of the rank 1, the areas M13 to M16 for providing the digital display are determined to be "priority" of the rank 2 as is the case with FIG. 11(C), and the other areas M1 to M4, M5, M8, M9, M12 are determined to be "CRC code generation necessary (minimum processing)" of the rank 3. Thus, as the CRC code generation rate is set to be the highest level for the warning indication WN, which is one of the most important indications, functional safety may be enhanced. Further, by lowering the CRC code generation rate for the other displays in accordance with the priority order, the processing load of hardware or software may be reduced.

By thus adjusting the generation rate of CRC codes (error detection codes) in accordance with the priority order, display errors may be intensively checked for the display with a high degree of importance, while the processing load on the hardware and the software is reduced. In particular, as the reliability may be checked by focusing on the display area with a high degree of importance, more accurate and useful information may be notified. In other words, it is possible to provide useful information contributing to safe driving, which is conventionally difficult, and unprecedented high-level safe driving environments are achieved. Moreover, by not generating CRC codes in an area with a low priority order among areas obtained by division, the processing load on the device (control circuit board, etc.) for CRC codes is reduced.

Next, a reference is made to FIGS. 13(A) and 13(B). FIG. 13(A) is a diagram that illustrates an example of the configuration of the primary part of the vehicle display apparatus in an example where the first CRC is generated outside the control unit and is input to the control unit, and FIG. 13(B) is a partially extracted view of another example of the configuration of the primary part. Further, although the above-described overall configuration of FIG. 3 or FIG. 8 is applied to the example of FIGS. 13(A) and 13(B) almost as it is, part of the configuration is different (described later). Moreover, in FIGS. 13(A) and 13(B), the same reference numerals are given to the same parts as those in the above-described drawings. Explanation for the same parts is omitted.

In the example of FIGS. 13(A) and 13(B), a driving support system 500 wirelessly transmits map data (image data on a map) as navigation information and a first CRC code for the map data to the vehicle side, and a navigation-information etc. acquiring unit 600 included in the vehicle acquires the map data and the first CRC code based on the received wireless signals and feeds them to the control unit 30 (the display control IC 50 thereof). Further, in the example of FIGS. 13(A) and 13(B), as is the case with the example of FIG. 11(B), the meter (meter panel) 310 that displays the vehicle speed, and the like, is used as the display 82.

As illustrated in FIG. 13(A), the map data FMP may be displayed near the center of the meter (meter panel) 310, or a display 85 dedicated to map data may be provided adjacent to the meter (meter panel) 310 and the map data FMP may be displayed thereon. Furthermore, in the example of FIG. 13(A), for the display using the map data FMP, a triangular icon PS indicating the current driving position is presented on road information QR near the vehicle in a superimposed manner.

Further, the possible configurations at the side of the display drive unit 84 include the configuration in which the CRC generating unit 86 (the block indicated by a heavy line in a highlighted manner) is provided as illustrated in FIG. 13(A) and the configuration in which a CRC separating unit 87 (the block indicated by a heavy line in a highlighted manner) is provided as illustrated in FIG. 13(B).

According to the above embodiment, the control unit 30 (the display control IC 50 thereof) generates the CRC code (the first CRC code) at the side of the control unit 30; however, in the example of FIGS. 13(A) and 13(B), the first CRC code is generated outside (an external unit) the control unit 30 and is input to the control unit 30 together with the image data. As the first CRC code has already been generated, the control unit 30 does not have to generate it. In other words, a CRC separating unit 542 included in the display control IC 50 may acquire the first CRC code by separating and extracting the first CRC code added to the map data (image data).

Furthermore, in the example of FIG. 13(A), the control unit 30 transmits only image data input from the outside to the display drive unit 84. Further, in the example of FIG. 13(B), the control unit 30 transmits both the image data and the first CRC code, which are input from the outside, to the display drive unit 84.

In FIG. 13(A), in the display drive unit 84, the CRC generating unit 86 generates the second CRC code based on received map data (image data) (this aspect is the same as that in the above embodiment).

Further, in FIG. 13(B), in the display drive unit 84, the CRC separating unit 87 separates only the first CRC code from the received image data (map data) and the first CRC code and outputs it. In this case, as for the image data (map data), if data corruption or data loss occurs in image data received by the display drive unit due to effects of electromagnetic wave noise, or the like, there is a high possibility that data corruption or data loss also occurs in the first CRC code received by the display drive unit 84. Therefore, the separated first CRC code is treated as the second CRC code and it is used to be compared (compare check) with the first CRC code, whereby it is possible to determine a match/mismatch.

Thus, when the first CRC code is not generated inside the control unit 30, i.e., when the first CRC code is generated in the process to reach the control unit 30, e.g., image data (map data) for navigation and the first CRC code added thereto are generated by the external driving support system 500 and input to the control unit 30 as illustrated in FIG. 13(A), it is possible to compare (compare check) CRC codes. Therefore, the same advantage as that in the above-described embodiment may be obtained.

As described above, according to the present invention, even when an error occurs in the image on the display in the vehicle display apparatus, proper notification is performed so as not to cause confusion to the user of the vehicle. Therefore, it is possible to achieve the vehicle display apparatus that has higher reliability and is more practical.

The present invention is not limited to the above-described embodiment that is illustrated by an example, and those skilled in the art may easily modify the above-described embodiment illustrated by an example in the range included in the scope of claims.

DESCRIPTION OF REFERENCE NUMERALS

1 Liquid crystal display device (display unit)
2, 3 Analog meter
4 Light-emitting element or light-emitting element unit (LED (or LED unit) for master warning) having a warning function
5 Light-emitting element or light-emitting element unit (LED (or LED unit) for ambient illumination) having a function to illuminate the surroundings
6a, 6b Light-emitting element or light-emitting element unit (indicator LED (or LED unit)) for displaying various types of information
7 Outer case body
8 Bar graph
9 Digital display area
10 Vehicle display apparatus
20 Higher-level device
30 Control unit (control circuit board)
32 Display (TFT panel)
39 Communication interface (communication I/F)
40 MPU
43 Power supply circuit
54 First CRC generating unit
56 Match determining unit
58 Log recording unit
59 Reliability degradation detecting unit
60 Notification-necessity determining unit
61 Notification-information output unit
62 Meter driver
64 LED driver,
66 LED driver
69 Backlight control unit
82 Display (TFT panel)
84 Display drive unit (TFT driver)
86 Second CRC generating unit
88 Power IC
89 Backlight
90 Speaker driver
92 Speaker
94 Sound output unit (sound output unit included in vehicle display apparatus)
100 Information system (higher-level system)
102 HUD device
104 Speaker driver
106 Speaker
110 Sound output unit (sound output unit included in higher-level device)
112 Nonvolatile memory
114 Volatile memory
a First cable (cable for image data communication)
b Second cable (cable for backlight control)
b3 Signal line for communicating image data
b5' Signal line for communicating information (CRC code, etc.) necessary for match determination (desired example)
b5 Undesired example of signal line
310 Meter (meter panel)
312 Brake warning light (brake light)
314 Charge warning light (battery lamp)
316 Oil-pressure warning light (engine oil lamp)
318 Water-temperature warning light
540, 560 Divided-area CRC generating unit
M1 to M16 Divided area (area corresponding to one section after division)

The invention claimed is:

1. A vehicle display apparatus comprising:
a display that is mounted on a vehicle and displays vehicle information;
any one or both of i) at least one light-emitting element and ii) a speaker;
a display drive unit that drives the display; and
a control unit that controls the display drive unit so as to display an image on the display and that controls an operation of at least one of the at least one light-emitting element and the speaker, wherein
the control unit generates a first error detection code based on image data transmitted from the control unit to the display,
the display drive unit generates a second error detection code based on image data received by the display drive unit,
the control unit or the display drive unit determines a match between the first error detection code and the second error detection code, and the control unit is further configured to:
determines whether a notification is necessary by detecting whether an error recognizable by a user of the vehicle has occurred in the image on the display based on determining that a mismatch between the first error detection code and the second error detection code is detected; and
when the notification is determined to be necessary, generates notification information for notifying that reliability of the image on the display has degraded and outputs the generated notification information to control the operation of at least any one of the at least one light-emitting element and the speaker or outputs the generated notification information to a higher-level device of the vehicle display apparatus so as to provide notification via the higher-level device.

2. The vehicle display apparatus according to claim 1, wherein the control unit determines that the notification is necessary when the mismatch between the first error detection code and the second error detection code has occurred during a predetermined period of time.

3. The vehicle display apparatus according to claim 2, wherein
the control unit and the display drive unit are connected via a first cable and a second cable different from the first cable,
when the control unit transmits the image data to the display drive unit, transmission is conducted via the first cable, and when the display drive unit transmits the second error detection code or information indicating a result of a match determination between the first error detection code input to the control unit and the second error detection code generated or output by the display drive unit to the control unit, transmission is conducted via the second cable, and
when the control unit transmits the first error detection code to the display drive unit, transmission is conducted via the second cable.

4. The vehicle display apparatus according to claim 1, wherein
the control unit and the display drive unit are connected via a first cable and a second cable different from the first cable,
when the control unit transmits the image data to the display drive unit, transmission is conducted via the first cable, and when the display drive unit transmits the second error detection code or information indicating a result of a match determination between the first error detection code and the second error detection code to the control unit, transmission is conducted via the second cable, and
when the control unit transmits the first error detection code to the display drive unit, transmission is conducted via the second cable.

5. The vehicle display apparatus according to claim 1, wherein
the at least one light-emitting element is a warning light, and
the control unit:
gives a warning about an event related to the vehicle by on displaying an image for warning on the display when the warning is given for the event by using a light emission state of the at least one light-emitting element as the warning light; and
when the image for warning is displayed on the display,
i) determine the match between the first error detection code and the second error detection code and ii) generates and output the notification information.

6. The vehicle display apparatus according to claim 1, wherein
the at least one light-emitting element illuminates surroundings, and provides a notification that reliability of a display image on the display has degraded, the at least one light-emitting element illuminating the surroundings entering a different light emitting state as compared with a case of illuminating the surroundings, and
the speaker provides the notification that the reliability of the display image on the display has degraded with sound or voice.

7. The vehicle display apparatus according to claim 1, wherein a CRC (Cyclic Redundancy Check: cyclic redundancy check) code is used for the first error detection code and the second error detection code.

8. The vehicle display apparatus according to claim 1, wherein
one screen displayed on the display is divided into a plurality of areas,
the first and the second error detection codes are generated as an error detection code for an area specified on a section-by-section basis after dividing the one screen into the plurality of areas, and
the match between the first and the second error detection codes with respect to the area specified on the section-by-section basis after dividing the one screen into the plurality of areas.

9. The vehicle display apparatus according to claim 8, wherein numbers of times the first and the second error detection codes are generated are adjusted per unit time in accordance with a priority order determined based on importance of the display in the area specified on the section-by-section basis after dividing the one screen into the plurality of areas.

10. The vehicle display apparatus according to claim 9, wherein the first and the second error detection codes are not generated when the priority order is low for the area specified on the section-by-section basis after dividing the one screen into the plurality of areas.

11. The vehicle display apparatus according to claim 8, wherein the control unit determines that the notification is necessary when the mismatch between the first error detection code input to the control unit and the second error detection code generated or output by the display drive unit has occurred during a predetermined period of time.

12. A vehicle display apparatus comprising:
a display that is mounted on a vehicle and displays vehicle information;
any one or both of i) at least one light-emitting element and ii) a speaker;
a display drive unit that drives the display; and
a control unit that controls the display drive unit so as to display an image on the display and that controls an operation of at least one of the at least one light-emitting element and the speaker, wherein
the control unit receives image data, generates a first error detection code based on the image data, and transmits only the image data or both the image data and the first error detection code to the display drive unit,
the display drive unit generates a second error detection code based on the image data received from the control unit or separates only the first error detection code from the image data and the first error detection code, received by the display drive unit, and outputs as the second error detection code, the control unit or the display drive unit determines a match between the first error detection code input to the control unit and the second error detection code generated or output by the display drive unit, and the control unit is further configured to:
- determines whether a notification is necessary by detecting whether an error recognizable by a user of the vehicle has occurred in the image on the display based on determining a mismatch between the first error detection code input to the control unit and the second error detection code generated or output by the display drive unit; and
- when the notification is determined to be necessary, generates notification information for notifying that reliability of the image on the display has degraded and outputs the generated notification information to control the operation of at least any one of the at least one light-emitting element and the speaker or outputs the generated notification information to a higher-level device of the vehicle display apparatus so as to provide the notification via the higher-level device.

* * * * *